(12) United States Patent
Kum et al.

(10) Patent No.: US 12,199,364 B2
(45) Date of Patent: Jan. 14, 2025

(54) ANTENNA STRUCTURE IN WIRELESS COMMUNICATION SYSTEM

(71) Applicant: Samsung Electronics Co., Ltd., Suwon-si (KR)

(72) Inventors: Junsig Kum, Suwon-si (KR); Hyunjin Kim, Suwon-si (KR); Youngjun Kim, Suwon-si (KR); Yoongeon Kim, Suwon-si (KR); Seungho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 17/927,837

(22) PCT Filed: Jun. 22, 2021

(86) PCT No.: PCT/KR2021/007796
§ 371 (c)(1),
(2) Date: Nov. 25, 2022

(87) PCT Pub. No.: WO2021/261876
PCT Pub. Date: Dec. 30, 2021

(65) Prior Publication Data
US 2023/0216203 A1    Jul. 6, 2023

(30) Foreign Application Priority Data
Jun. 23, 2020    (KR) .................. 10-2020-0076695

(51) Int. Cl.
*H01Q 9/04*    (2006.01)
*H01Q 1/38*    (2006.01)
(Continued)

(52) U.S. Cl.
CPC ............... *H01Q 9/045* (2013.01); *H01Q 1/38* (2013.01); *H01Q 9/40* (2013.01); *H04B 7/0413* (2013.01)

(58) Field of Classification Search
None
See application file for complete search history.

(56) References Cited

U.S. PATENT DOCUMENTS 9,123,992 B2    9/2015    Lee
9,276,323 B2    3/2016    Moon et al.
(Continued)

FOREIGN PATENT DOCUMENTS

CN        101197470 B    6/2008
JP        2009-088625 A    4/2009
(Continued)

OTHER PUBLICATIONS

Extended European Search Report dated Sep. 12, 2023, issued in European Patent Application No. 21827946.1.
(Continued)

*Primary Examiner* — Anh Q Tran
(74) *Attorney, Agent, or Firm* — Jefferson IP Law, LLP

(57)    ABSTRACT

The present disclosure provides a surface-mountable antenna structure that is applicable to a broadband massive multi-input multi-output (MIMO) unit (MMU) in a wireless communication system. An antenna structure according to an embodiment of the present disclosure comprises: a printed circuit board including a first ground port, a second ground port, and a first feeding port; a first antenna electrically connected to the first ground port; a second antenna electrically connected to the second ground port; and a first feeding plate including a first bending part electromagnetically coupled to the first antenna, a second bending part electromagnetically coupled to the second antenna, and a
(Continued)

third bending part electrically connected to the first feeding port.

16 Claims, 28 Drawing Sheets

(51) Int. Cl.
*H01Q 9/40* (2006.01)
*H04B 7/0413* (2017.01)

(56) References Cited

U.S. PATENT DOCUMENTS

| | | |
|---|---|---|
| 10,389,018 B2 | 8/2019 | Daojian et al. |
| 2005/0057417 A1* | 3/2005 | Teillet .................. H01Q 3/30 343/810 |
| 2013/0307743 A1 | 11/2013 | Moon et al. |
| 2017/0062940 A1 | 3/2017 | Cao |
| 2017/0288312 A1 | 10/2017 | Koskiniemi et al. |
| 2018/0261929 A1 | 9/2018 | Biscontini et al. |
| 2018/0337462 A1 | 11/2018 | Vollmer et al. |
| 2018/0358706 A1 | 12/2018 | Kildal et al. |
| 2020/0106195 A1 | 4/2020 | Fleancu et al. |
| 2020/0185838 A1* | 6/2020 | Li .................. H01Q 21/26 |

FOREIGN PATENT DOCUMENTS

| | | |
|---|---|---|
| KR | 10-1084746 B1 | 11/2011 |
| KR | 10-2012-0088471 A | 8/2012 |
| KR | 10-2014-0055290 A | 5/2014 |
| WO | 2019/062445 A1 | 4/2019 |

OTHER PUBLICATIONS

Korean Office Action dated Jun. 13, 2024, issued in Korean Application No. 10-2020-0076695.

* cited by examiner

ANTENNA STRUCTURE IN WIRELESS COMMUNICATION SYSTEM

TECHNICAL FIELD

The disclosure relates to an antenna structure, and more particularly, to a broadband antenna structure used in a wireless communication system.

BACKGROUND ART

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post long term evolution (LTE) system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed. Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed constituent elements such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

DISCLOSURE OF INVENTION

Technical Problem

The disclosure provides a surface mountable antenna structure applicable to a wideband massive multi-input multi-output (massive MIMO unit (MMU)) in a wireless communication system.

Solution to Problem

An embodiment of the disclosure discloses an antenna structure. The antenna structure includes a printed circuit board including a first ground port, a second ground port, and a first feeding port; a first antenna electrically connected to the first ground port; a second antenna electrically connected to the second ground port; and a first feeding plate including a first bending part electromagnetically coupled to the first antenna, a second bending part electromagnetically coupled to the second antenna, and a third bending part electrically connected to the first feeding port.

The first feeding plate may further include a first body connected to the first bending part and the second bending part.

The first bending part may be bent by 90 degrees in a direction of a lower surface of the first body.

The second bending part may be bent by a predetermined angle in a direction of a lower surface of the first body.

The third bending part may be connected to the second bending part. The third bending part may be bent by a predetermined angle in a direction of an upper surface of the second bending part.

A length of the first bending part may be shorter than that of the second bending part.

The first antenna may include a radiator; a first ground plate connected to a first side surface of the radiator; a first ground part connected to a second side surface of the first ground plate; a second ground plate connected to the second side surface of the radiator; a second ground part connected to a second side surface of the second ground plate; and a third ground plate connected to a third side surface of the second ground plate.

The first ground plate may be bent by a predetermined angle in a direction of the second surface of the radiator.

The first ground part may be bent by a predetermined angle in a direction of the first surface of the first ground plate. The first ground part may be electrically connected to the first ground port.

The second ground plate may be bent by a predetermined angle in a direction of the second surface of the radiator.

The second ground part may be bent by a predetermined angle in a direction of the first surface of the second ground plate. The second ground part may be electrically connected to the first ground port.

The third ground plate may be bent by a predetermined angle in a direction of the second surface of the second ground plate.

The printed circuit board may further include a third ground port, a fourth ground port, and a second feeding port.

The antenna structure may further include a third antenna electrically connected to the third ground port; a fourth antenna electrically connected to the fourth ground port; and a second feeding plate including a first bending part electromagnetically coupled to the third antenna, a second bending part electromagnetically coupled to the second antenna, and a third bending part electrically connected to the first feeding port.

The second feeding plate may be disposed at the lower end of the first feeding plate. The second feeding plate may be disposed to cross the first feeding plate in a cross shape.

The antenna structure may further include a supporting dielectric including a fixing part for fixing the first feeding plate. The fixing part may be formed at a lower surface of the supporting dielectric.

The supporting dielectric may further include a parasitic element.

The parasitic element may enclose side surfaces of the supporting dielectric.

The parasitic element may be disposed at an edge of an upper surface of the supporting dielectric.

The first antenna and the second antenna may be disposed at a lower surface of the supporting dielectric.

Advantageous Effects of Invention

An antenna structure according to an embodiment of the disclosure has an effect capable of being applied to a wideband MMU in a wireless communication system.

An antenna structure according to an embodiment of the disclosure has an effect capable of being mounted on a surface of a PCB.

An antenna structure according to an embodiment of the disclosure has an effect capable of improving a bandwidth performance.

An antenna structure according to an embodiment of the disclosure has an effect capable of improving mass productivity.

MODE FOR THE INVENTION

Figure 1:
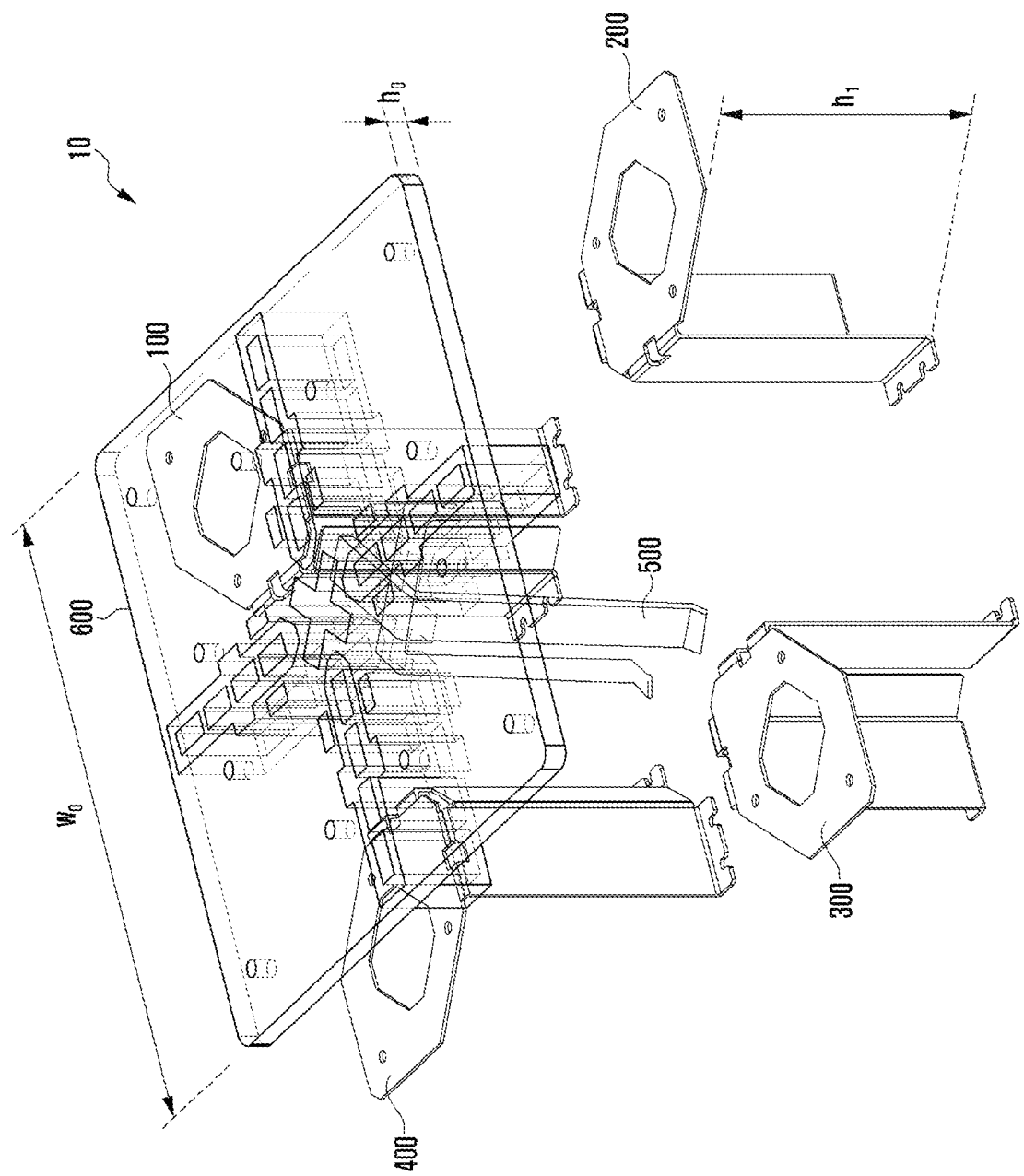
FIG. 1 is a perspective view illustrating an antenna according to an embodiment of the disclosure.

FIG. 1 is a perspective view illustrating an antenna according to an embodiment of the disclosure.

With reference to FIG. 1, an antenna 10 may include a plurality of dipole antennas 100 to 400, a feeding structure 500, and a supporting dielectric structure 600. A horizontal length w0 of the antenna 10 may be 46.5 mm to 50 mm. A vertical length of the antenna 10 may be 46.5 mm to 50 mm. A height of the antenna 10 may be 22 mm to 23.5 mm. For example, a height h0 of a supporting dielectric structure 600 may be 1.5 mm. A height h1 of each of the plurality of dipole antennas 100 to 400 may be 22 mm. A height of a radome (not illustrated) covering the antenna 10 may be 30 mm.

Figure 2:
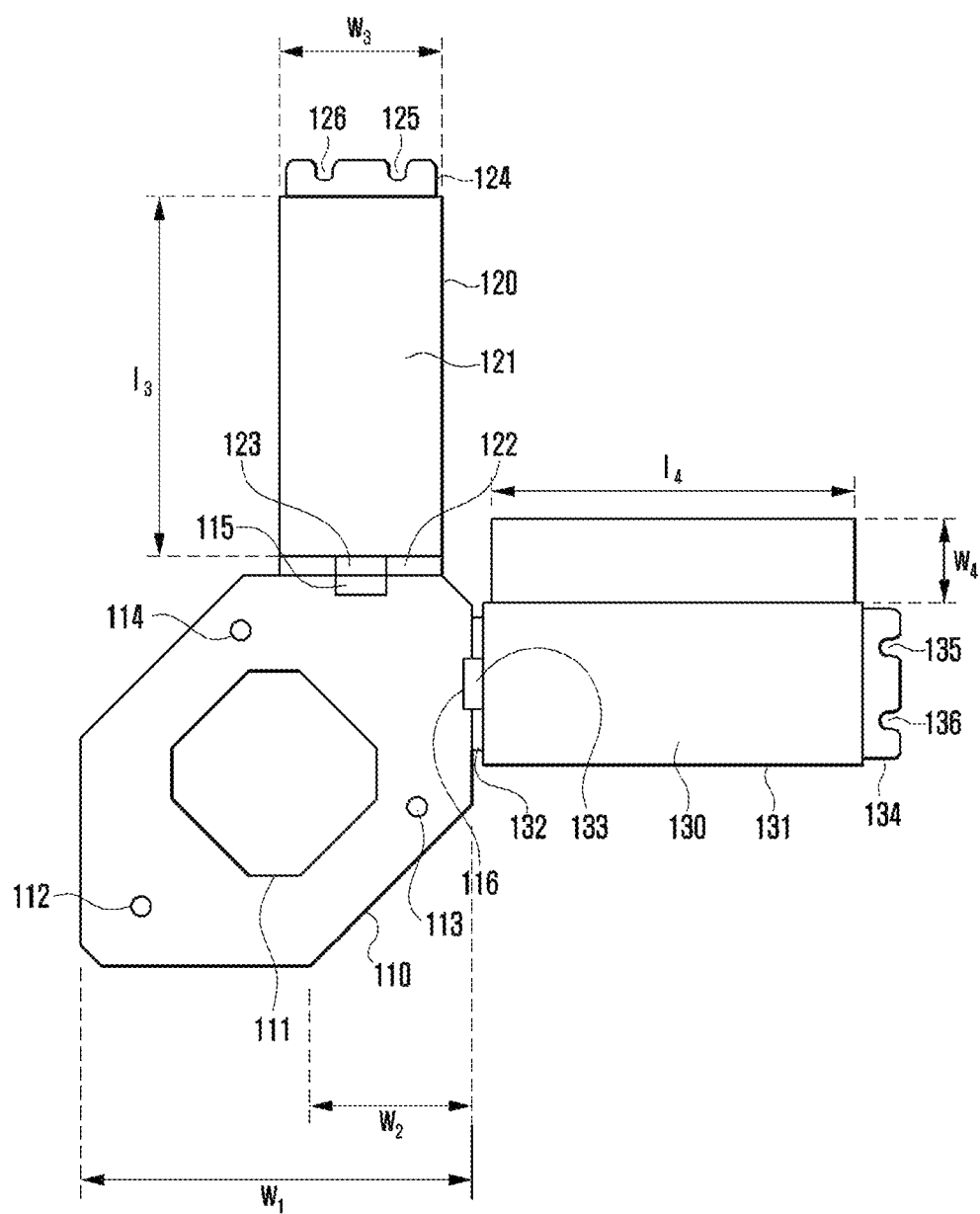
FIG. 2 is a conceptual diagram illustrating a dipole antenna according to an embodiment of the disclosure.

FIG. 2 is a conceptual diagram illustrating a dipole antenna according to an embodiment of the disclosure.

With reference to FIG. 2, a first dipole antenna 100 may include a radiator 110, a first ground 120, and a second ground 130.

The radiator 110 may be an octagonal conductive plate. For example, the radiator 110 may include a central hole 111, a first hole 112, a second hole 113, a third hole 114, a first groove 115, and a second groove 116. For example, the central hole 111 may be formed in an octagonal shape in a central portion of the radiator 110. The first hole 112 may be formed in a circular shape around the central hole 111. The second hole 113 may be formed in a circular shape around the central hole 111. The third hole 114 may be formed in a circular shape around the central hole 111. The first groove 115 may face a first side surface of the first ground 120. The second groove 116 may face the first side surface of the second ground 130. For example, a horizontal length w1 of the radiator 110 may be 20 mm.

The first ground 120 may be a conductive plate. The first ground 120 may include a main body 121, a first bending part 122, a first groove 123, a second bending part 124, a second groove 125, a third groove 126, and an auxiliary portion 127. For example, the first bending part 122 may be connected to the first side surface of the radiator 110 and the first side surface of the main body 121 of the first ground 120. The first groove 123 may be formed in the first bending part 122. The second bending part 124 may be connected to a second side surface of the main body 121 of the first ground 120. The second groove 125 and the third groove 126 may be formed in the second bending part 124. For example, a horizontal length w3 of the main body 121 may be 8 mm. A vertical length l3 of the main body 121 may be 21.5 mm. A horizontal length w3 of the main body 121 may be the same as the straight length w2 of a portion of the side surface of the radiator 110.

The second ground 130 may be a conductive plate. The second ground 130 may include a main body 131, a first bending part 132, a first groove 133, a second bending part 134, a second groove 135, and a third groove 136. For example, the first bending part 132 may be connected to the second side surface of the radiator 110 and the first side surface of the main body 131 of the second ground 130. The first groove 133 may be formed in the first bending part 132. The second bending part 134 may be connected to a second side surface of the main body 131 of the second ground 130. The second groove 135 and the third groove 136 may be formed in the second bending part 134. The auxiliary portion 137 may be connected to a third side surface of the main body 131 of the second ground 130. For example, a horizontal length of the main body 131 of the second ground 130 may be the same as the horizontal length w3 of the main body 121 of the first ground 120. A vertical length of the main body 131 of the second ground 130 may be the same as the vertical length l3 of the main body 121 of the first ground 120. A horizontal length w4 of the second bending part 134 may be 4 mm. A vertical length l4 of the second bending part 134 may be 19 mm.

Figure 3:
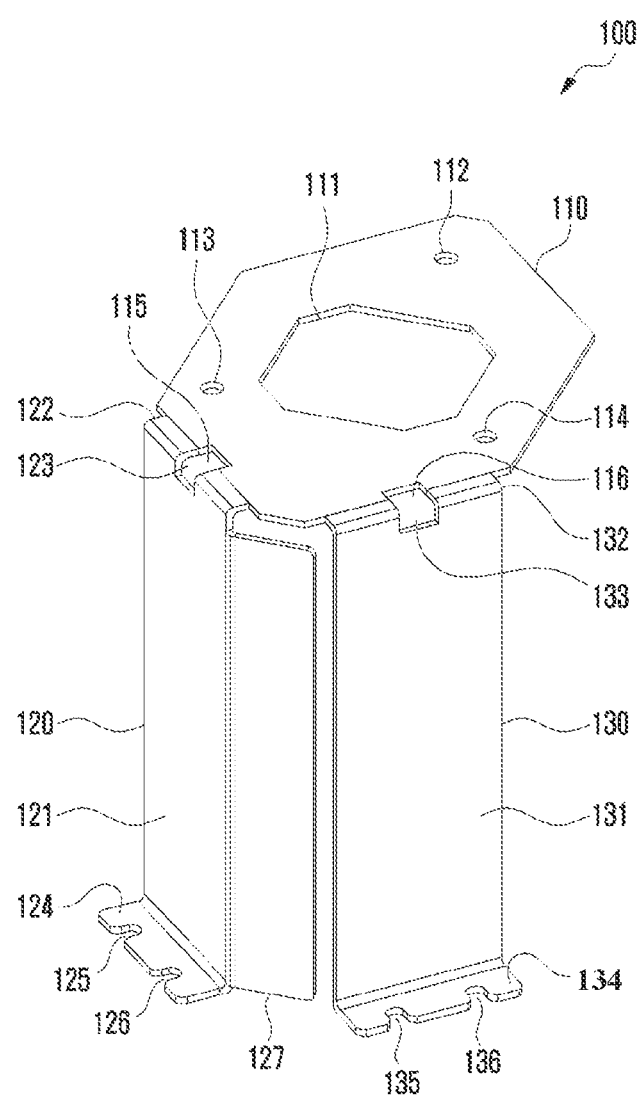
FIG. 3 is a conceptual diagram illustrating a dipole antenna according to an embodiment of the disclosure.

FIG. 3 is a conceptual diagram illustrating a dipole antenna according to an embodiment of the disclosure.

With reference to FIG. 3, the first bending part 122 may be bent by a predetermined angle in a direction of the first surface of the main body 121 based on a horizontal direction of the main body 121 of the first ground 120. For example, the first bending part 122 may be bent by about 90 degrees in a direction of the first surface of the main body 121 based on a horizontal direction of the main body 121 of the first ground 120.

The second bending part 124 may be bent by a predetermined angle in a direction of the second surface of the main body 121 based on a horizontal direction of the main body 121 of the first ground 120. For example, the second bending part 124 may be bent by about 90 degrees in a direction of the second surface of the main body 121 based on a horizontal direction of the main body 121 of the first ground 120.

The auxiliary portion 127 may be bent by a predetermined angle in a direction of the first surface of the main body 121 based on a horizontal direction of the main body 121 of the first ground 120. For example, the auxiliary portion 127 may be bent by about 45 degrees in a direction of the first surface of the main body 121 based on a horizontal direction of the main body 121 of the first ground 120.

The first bending part 132 may be bent by a predetermined angle in a direction of the first surface of the main body 131 based on a horizontal direction of the main body 131 of the second ground 130. For example, the first bending part 132 may be bent by about 90 degrees in a direction of the first surface of the main body 131 based on a horizontal direction of the main body 131 of the second ground 130.

The second bending part 134 may be bent by a predetermined angle in a direction of the second surface of the main body 131 based on a horizontal direction of the main body 131 of the second ground 130. The second bending part 134 may be bent by about 90 degrees in a direction of the second surface of the main body 131 based on a horizontal direction of the main body 131 of the second ground 130.

Figure 4:
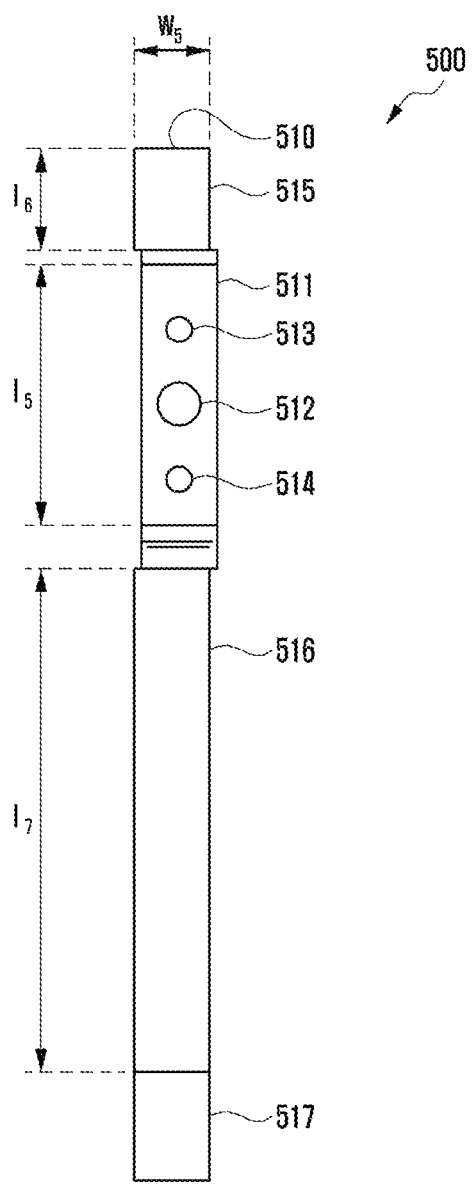
FIG. 4 is a conceptual diagram illustrating a feeding structure according to an embodiment of the disclosure.
Figure 5:
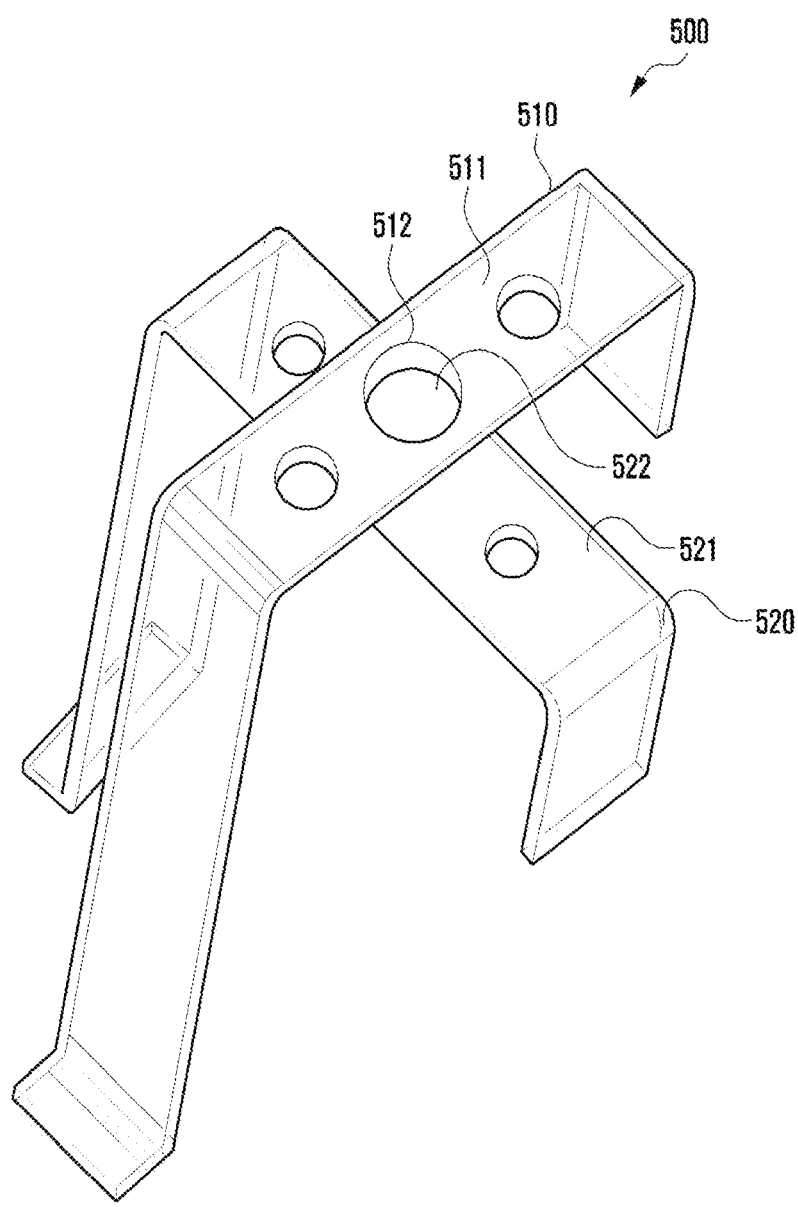
FIG. 5 is a conceptual diagram illustrating a feeding structure according to an embodiment of the disclosure.

FIG. 4 is a conceptual diagram illustrating a feeding structure according to an embodiment of the disclosure. FIG. 5 is a conceptual diagram illustrating a feeding structure according to an embodiment of the disclosure.

With reference to FIGS. 4 and 5, a feeding structure 500 may include a first feeding structure 510 and a second feeding structure 520. The first feeding structure 510 may be a conductive plate. The second feeding structure 520 may be a conductive plate. For example, the first feeding structure 510 may include a main body 511, a first bending part 515, a second bending part 516, and a third bending part 517. For example, a horizontal length w5 of the first feeding structure 510 may be 2.5 mm. A vertical length l5 of the main body 511 may be 9 mm. A vertical length l6 of the first bending part 515 may be 5.3 mm. A vertical length l7 of the second bending part 516 may be 16.3 mm to 18 mm.

A first hole 512, a second hole 513, and a third hole 514 may be formed in the main body 511. For example, the first hole 512 may be formed in a circular shape in a central portion of the main body 511. The second hole 513 may be spaced apart from the first hole 512 by a predetermined distance in a first direction to be formed in a circular shape in the main body 511. The third hole 514 may be spaced apart from the first hole 512 by a predetermined distance in a second direction to be formed in a circular shape in the main body 511.

The first bending part 515 may be connected to a first side surface of the main body 511. The first bending part 515 may be bent by about 90 degrees in a direction of the second surface of the main body 511 based on a horizontal direction of the main body 511. The second bending part 516 may be connected to the second side surface of the main body 511. The second bending part 516 may be bent by about 90 degrees in a direction of the second surface of the main body 511 based on a horizontal direction of the main body 511. The third bending part 517 may be connected to a second side surface of the second bending part 516. The third bending part 517 may be bent by about 90 degrees in a direction of the first surface of the second bending part 516 based on a horizontal direction of the second bending part 516.

The second feeding structure 520 may be the same as or similar to the first feeding structure 510. A main body 521 of the second feeding structure 520 may be disposed to cross the main body 511 of the first feeding structure 510 in a cross shape. For example, the first surface of the main body 521 of the second feeding structure 520 may face the second surface of the main body 511 of the first feeding structure 510. For example, a first hole 522 of the second feeding structure 520 may correspond to the first hole 512 of the first feeding structure 510.

Figure 6:
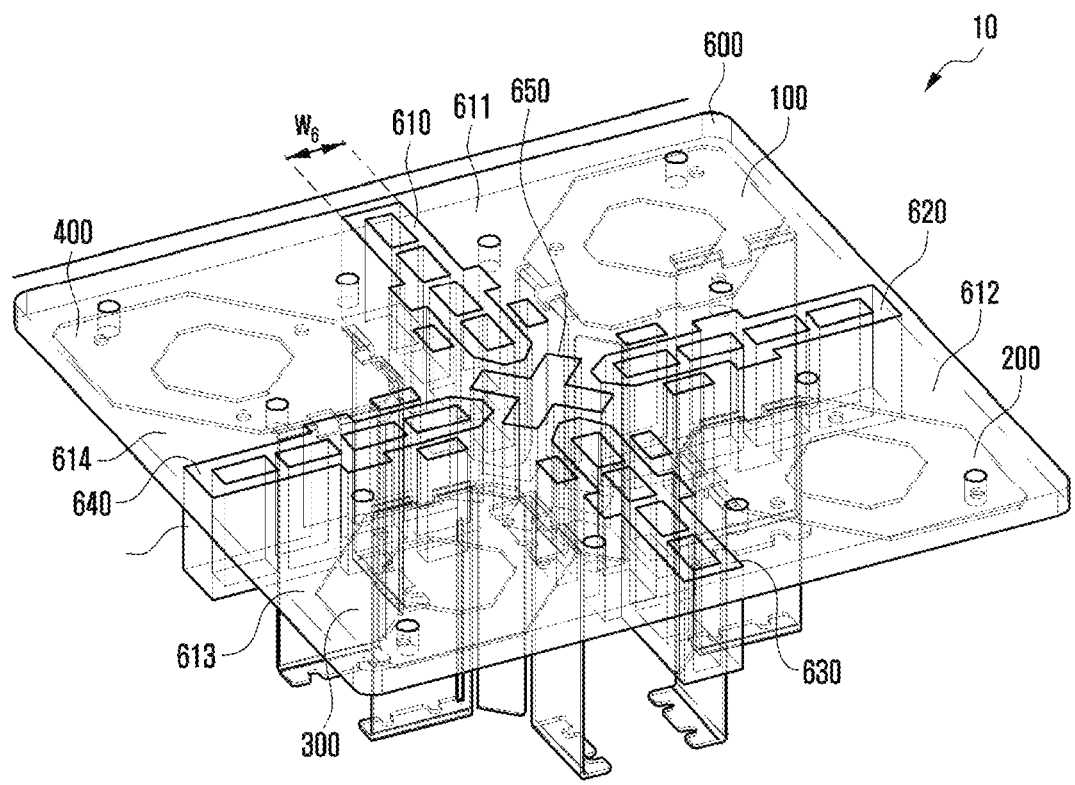
FIG. 6 is a conceptual diagram illustrating an antenna and a printed circuit board (PCB) according to an embodiment of the disclosure.
Figure 6:
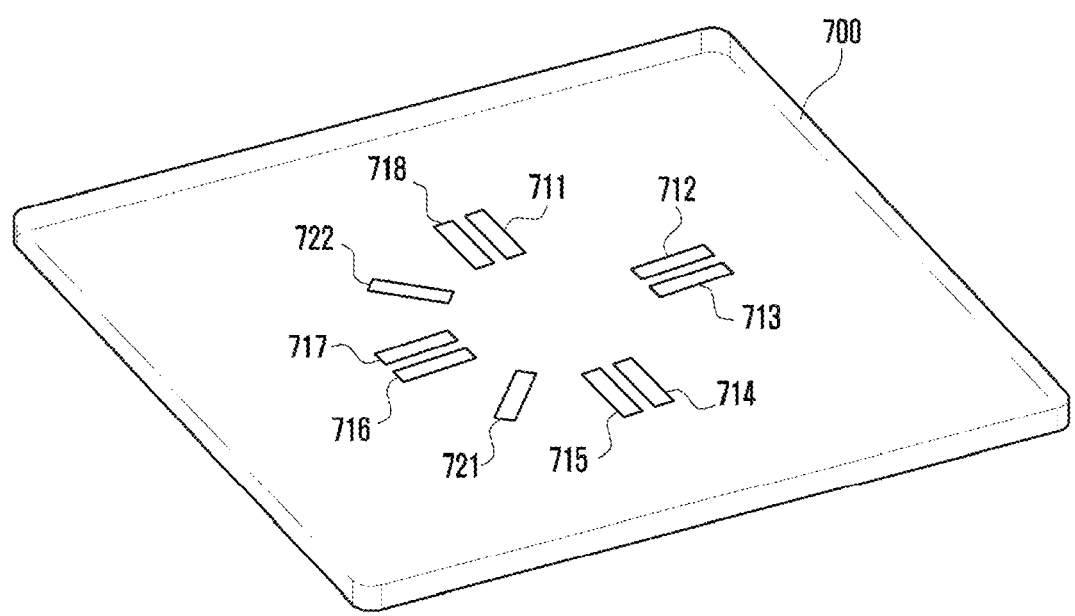

FIG. 6 is a conceptual diagram illustrating an antenna and a printed circuit board (PCB) according to an embodiment of the disclosure.

With reference to FIG. 6, a supporting dielectric structure 600 may include a plurality of support structures 610 to 650. For example, a horizontal length w6 of each of the plurality of support structures 610 to 650 may be 4 mm. For example, the plurality of support structures 610 to 650 may be formed at a second surface of the supporting dielectric structure 600. For example, the fifth support structure 650 may be formed in a central portion of the second surface of the supporting dielectric structure 600. The feeding structure 500 may be coupled to the supporting dielectric structure 600 through the fifth support structure 650. For example, the feeding structure 500 may be coupled to the fifth support structure 650. For example, a first surface of the main body 511 of the first feeding structure 510 and a first surface of the main body 521 of the second feeding structure 520 may face the fifth support structure 650.

The first to fourth support structures 610 to 640 may be formed at a second surface of the supporting dielectric structure 600 about the fifth support structure 650. For example, the first support structure 610 may be formed between a first area 611 and a fourth area 614 of the second surface of the supporting dielectric structure 600. The second support structure 620 may be formed between the first area 611 and a second area 612 of the second surface of the supporting dielectric structure 600. The third support structure 630 may be formed between the second area 612 and a third area 613 of the second surface of the supporting dielectric structure 600. The fourth support structure 640 may be formed between the third area 613 and the fourth area 614 of the second surface of the supporting dielectric structure 600.

The first dipole antenna 100 may be disposed in the first area 611 of the second surface of the supporting dielectric structure 600. For example, a first surface of the radiator 110 of the first dipole antenna 100 may face the first area 611 of the second surface of the supporting dielectric structure 600.

The second dipole antenna 200 may be disposed in the second area 612 of the second surface of the supporting dielectric structure 600. For example, a first surface of a radiator 210 of the second dipole antenna 200 may face the second area 612 of the second surface of the supporting dielectric structure 600.

The third dipole antenna 300 may be disposed in the third area 613 of the second surface of the supporting dielectric structure 600. For example, a first surface of a radiator 310 of the third dipole antenna 300 may face the third area 613 of the second surface of the supporting dielectric structure 600.

The fourth dipole antenna 400 may be disposed in the fourth area 614 of the second surface of the supporting dielectric structure 600. For example, a first surface of a radiator 410 of the fourth dipole antenna 400 may face the fourth area 614 of the second surface of the supporting dielectric structure 600.

A PCB 700 may include a plurality of ground ports 711 to 718 and a plurality of feeding ports 721 and 722. For example, the second bending part 124 of the first ground 120 of the first dipole antenna 100 may be electrically connected to the first ground port 711. The second bending part 134 of the second ground 130 of the first dipole antenna 100 may be electrically connected to the second ground port 712.

A second bending part 224 of a first ground 220 of the second dipole antenna 200 may be electrically connected to the third ground port 713. A second bending part 234 of a second ground 230 of the second dipole antenna 200 may be electrically connected to the fourth ground port 714.

A second bending part 324 of a first ground 320 of the third dipole antenna 300 may be electrically connected to the fifth ground port 715. A second bending part 334 of the second ground 330 of the third dipole antenna 300 may be electrically connected to the sixth ground port 716.

A second bending part 424 of a first ground 420 of the fourth dipole antenna 400 may be electrically connected to the seventh ground port 717. A second bending part 434 of a second ground 430 of the fourth dipole antenna 400 may be electrically connected to the eighth ground port 718.

A second surface of a third bending part 517 of a first feeding structure 510 may be electrically connected to the first feeding port 721.

A second surface of a third bending part 527 of a second feeding structure 520 may be electrically connected to the second feeding port 722.

Figure 7:
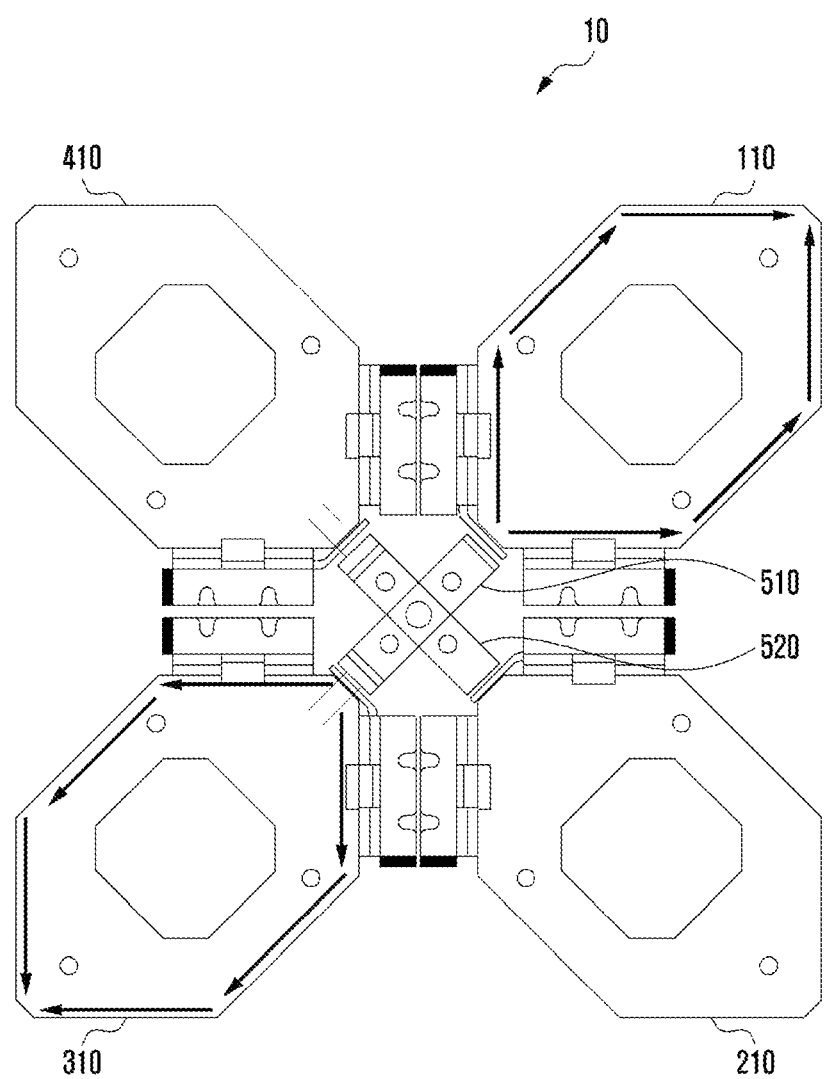
FIG. 7 is a top plan view illustrating an antenna according to an embodiment of the disclosure.

FIG. 7 is a top plan view illustrating an antenna according to an embodiment of the disclosure.

With reference to FIG. 7, the first dipole antenna 100 may receive electricity through the first feeding structure 510. The radiator 110 of the first dipole antenna 100 may output a wireless signal to the outside based on an electrical signal supplied from the first feeding structure 510. For example, the radiator 110 may form an electromagnetic field in a direction of an arrow according to an electrical signal supplied from the first feeding structure 510.

The third dipole antenna 300 may receive electricity through the first feeding structure 510. The radiator 310 of the third dipole antenna 300 may output a wireless signal to the outside based on an electrical signal supplied from the first feeding structure 510. For example, the radiator 310 may form an electromagnetic field in a direction of an arrow according to an electrical signal supplied from the first feeding structure 510.

For example, an electric field E and a magnetic field H formed by the radiator 110 of the first dipole antenna 100 or the radiator 310 of the third dipole antenna 300 may be defined as in Equation 1 or 2.

$$E = -\nabla\varphi - j\omega A \quad \text{Equation 1}$$

$$E = \frac{1}{j\omega\mu\varepsilon}\left[\nabla(\nabla \cdot A) + k^2 A\right]$$

$$H = \frac{1}{\mu}\nabla \times A \quad \text{Equation 2}$$

Further, the electric field E and the magnetic field H may be defined as in Equation 3.

$$E = \quad \text{Equation 3}$$

$$\int_V\left[-j\omega\mu J G + \frac{1}{\varepsilon}\rho\nabla' G\right]dV' = \frac{1}{j\omega\varepsilon}\int_V\left[(J\cdot\nabla')\nabla' G + k^2 J G\right]dV'$$

-continued $$H = \int_V J \times \nabla G dV'$$

Figure 8:
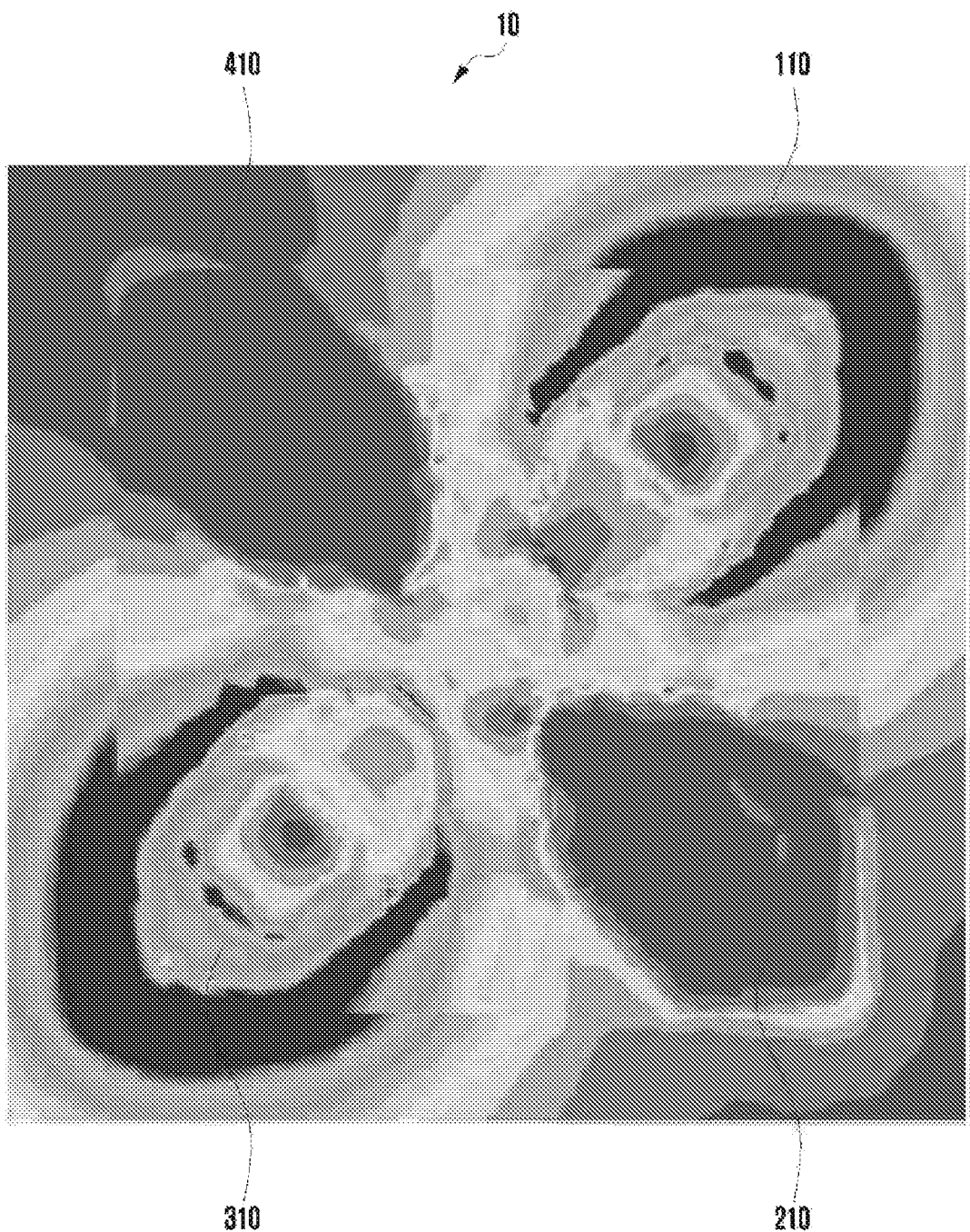
FIG. 8 is a conceptual diagram illustrating radiation characteristics of an antenna according to an embodiment of the disclosure.

For example, radiation characteristics of the radiator 110 of the first dipole antenna 100 and the radiator 310 of the third dipole antenna 300 may be the same as those of FIG. 8. The radiation characteristics of FIG. 8 may be radiation characteristics of a wireless signal for a low band of 2.3 GHz.

The second feeding structure 520 may operate the same as or similar to the first feeding structure 510. The radiator 210 of the second dipole antenna 200 may operate the same as or similar to the radiator 110 of the first dipole antenna 100. The radiator 410 of the fourth dipole antenna 400 may operate the same as or similar to the radiator 310 of the third dipole antenna 300.

Figure 9:
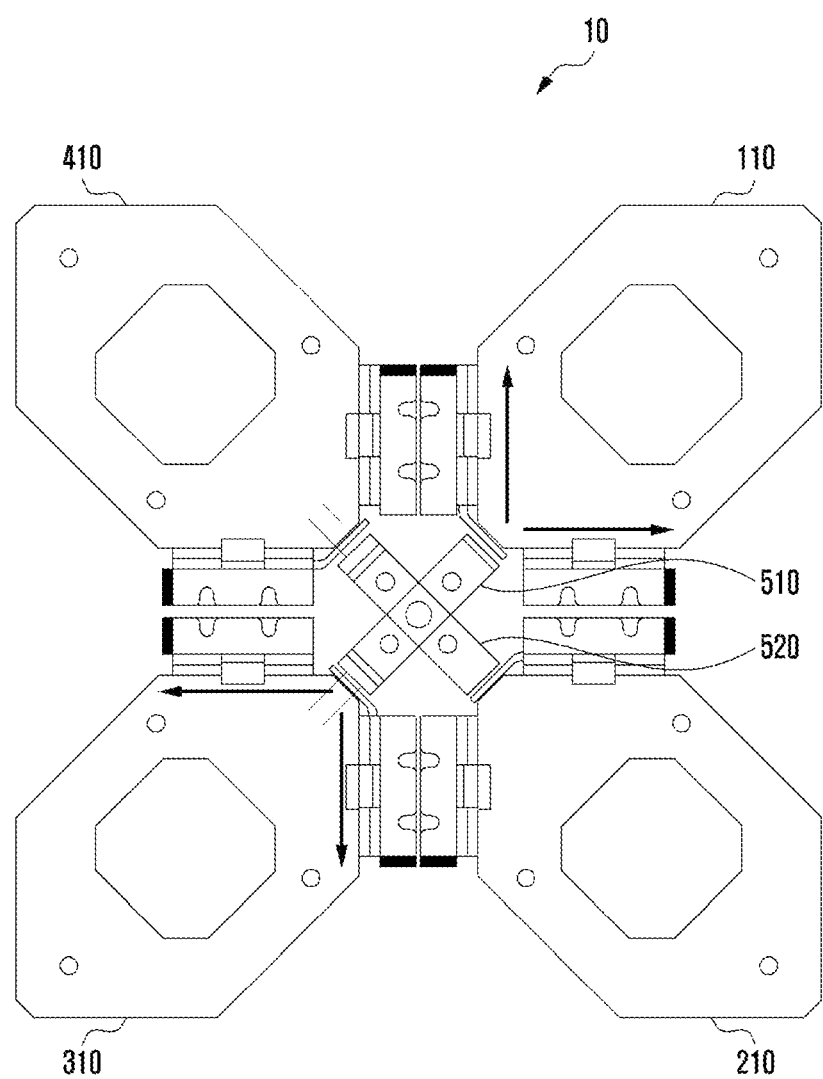
FIG. 9 is a top plan view illustrating an antenna according to an embodiment of the disclosure.

FIG. 9 is a top plan view illustrating an antenna according to an embodiment of the disclosure.

With reference to FIG. 9, the first dipole antenna 100 may receive electricity through the first feeding structure 510. The radiator 110 of the first dipole antenna 100 may output a wireless signal to the outside based on an electrical signal supplied from the first feeding structure 510. For example, the radiator 110 may form an electromagnetic field in a direction of an arrow according to an electrical signal supplied from the first feeding structure 510.

The third dipole antenna 300 may receive electricity through the first feeding structure 510. The radiator 310 of the third dipole antenna 300 may output a wireless signal to the outside based on an electrical signal supplied from the first feeding structure 510. For example, the radiator 310 may form an electromagnetic field in a direction of an arrow according to an electrical signal supplied from the first feeding structure 510.

Due to the duality of the antenna 10, factors of Equations 1 to 3 may be changed as follows.

E→H
J→Jm
A→Am
H→−E
ρ→ρm
φ→φm
ε→μ
Jm→−J
Am→−A
μ→ε
ρm→−ρ
φm→−φ

For example, the electric field E and the magnetic field H formed by the radiator 110 of the first dipole antenna 100 or the radiator 310 of the third dipole antenna 300 may be defined as in Equation 4 or 5.

$$E = \frac{1}{j\omega\mu\varepsilon}\left[\nabla(\nabla \cdot A) + k^2 A\right] - \frac{1}{\varepsilon}\nabla \times Am \quad \text{Equation 4}$$

$$H = \frac{1}{j\omega\mu\varepsilon}\left[\nabla(\nabla \cdot Am) + k^2 Am\right] - \frac{1}{\mu}\nabla \times A \quad \text{Equation 5}$$

Figure 10:
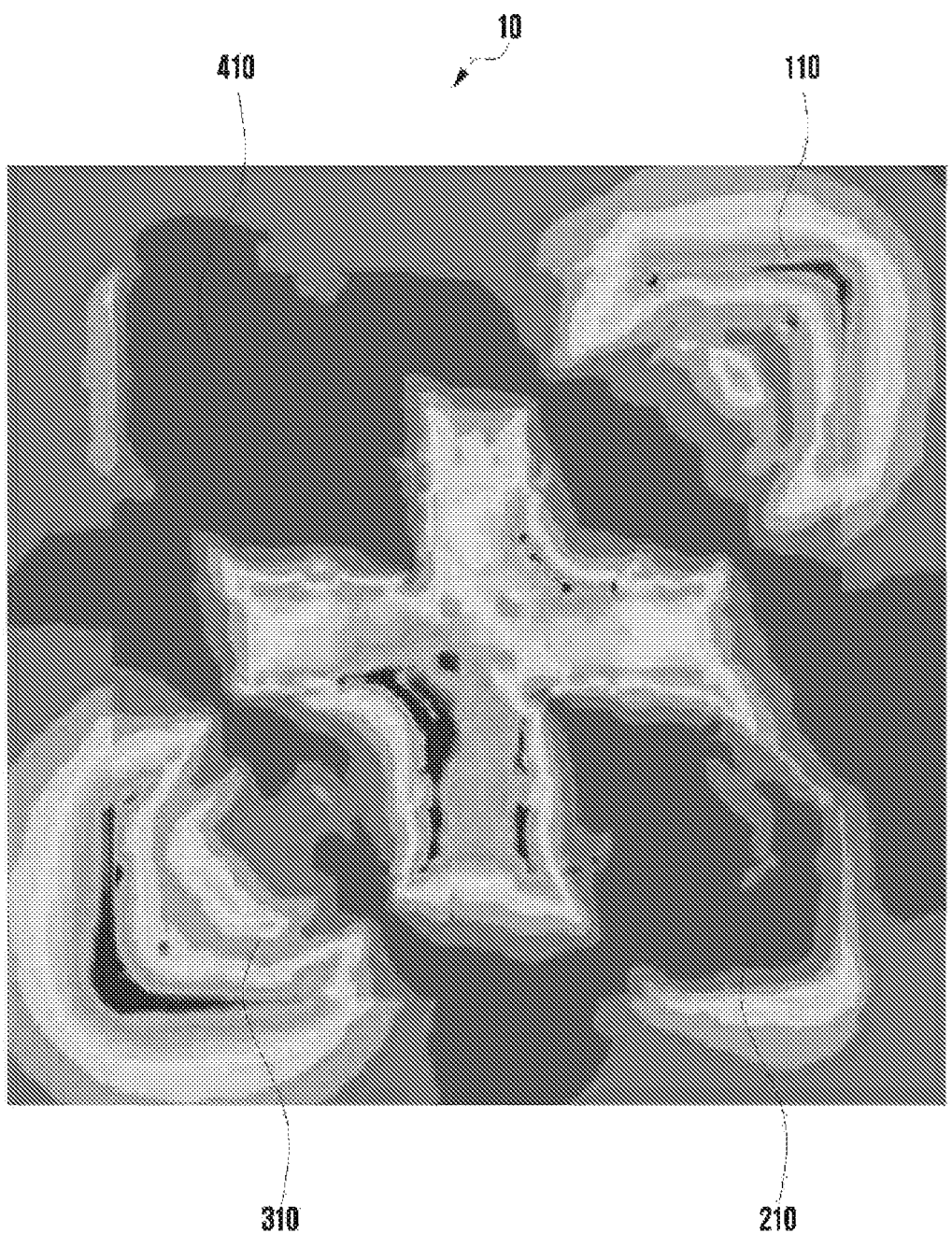
FIG. 10 is a conceptual diagram illustrating radiation characteristics of an antenna according to an embodiment of the disclosure.

For example, radiation characteristics of the radiator 110 of the first dipole antenna 100 and the radiator 310 of the third dipole antenna 300 may be the same as those of FIG. 10. The radiation characteristics of FIG. 10 may be radiation characteristics of a wireless signal for a high band of 3.5 GHz.

Figure 11:
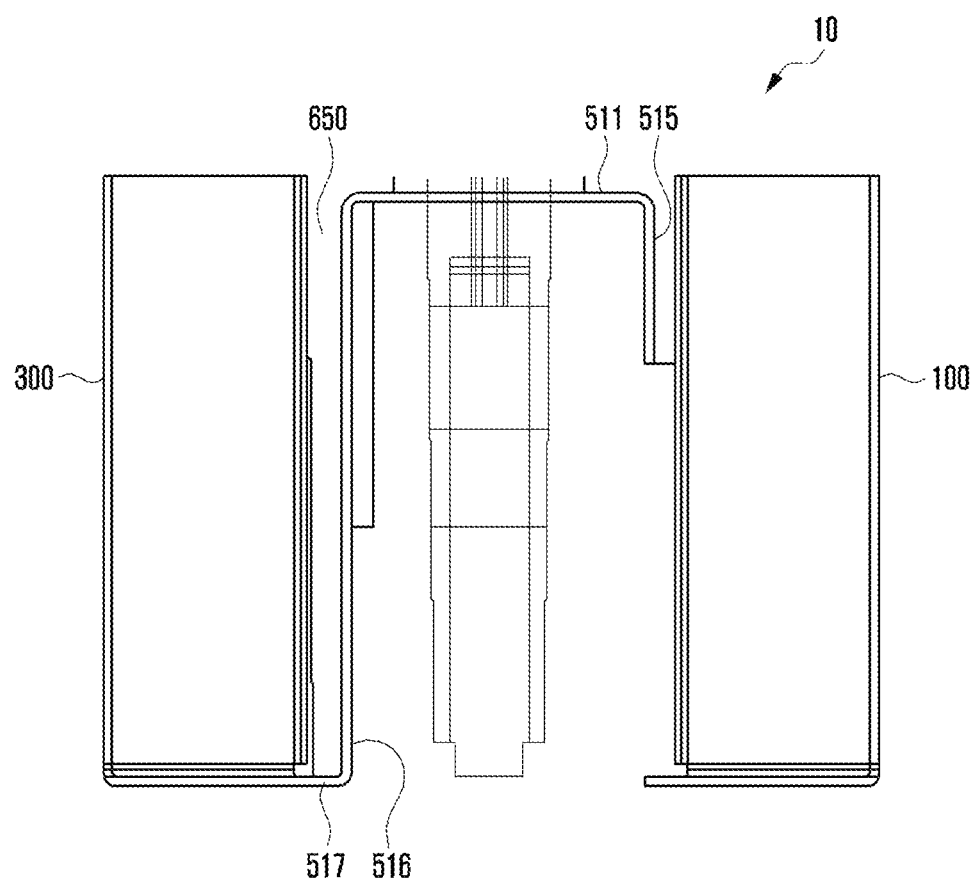
FIG. 11 is a side view illustrating an antenna according to an embodiment of the disclosure.
Figure 12:
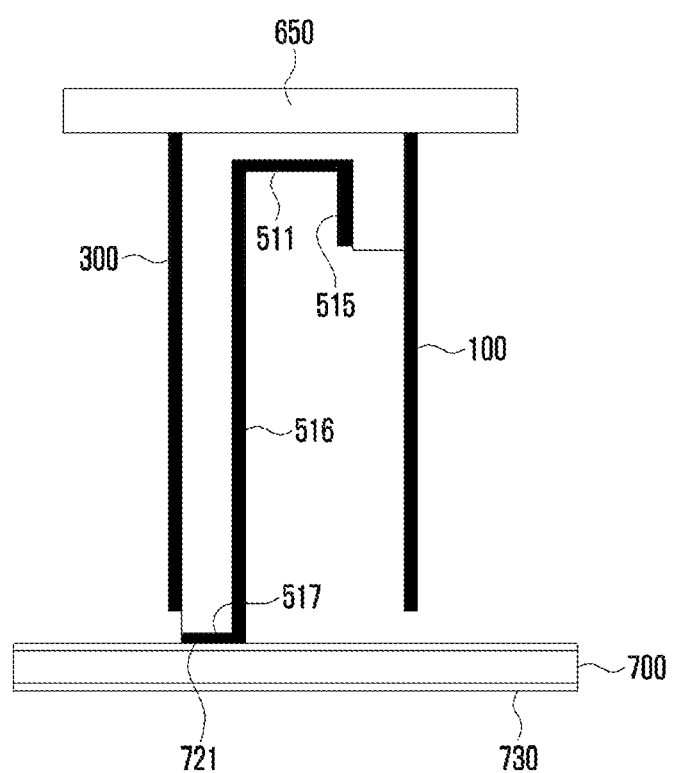
FIG. 12 is a conceptual diagram illustrating a side surface of an antenna according to an embodiment of the disclosure.

FIG. 11 is a side view illustrating an antenna according to an embodiment of the disclosure. FIG. 12 is a conceptual diagram illustrating a side surface of an antenna according to an embodiment of the disclosure.

With reference to FIGS. 11 and 12, the first feeding structure 510 may be coupled to the fifth support structure 650. The first dipole antenna 100 may be coupled to the fifth support structure 650. The second dipole antenna 200 may be coupled to the fifth support structure 650. A first bending part 515 of the first feeding structure 510 may be spaced apart from the first dipole antenna 100 by a predetermined distance by the fifth support structure 650. A second bending part 516 of the first feeding structure 510 may be spaced apart from the third dipole antenna 300 by a predetermined distance by the fifth support structure 650.

A third bending part 517 of the first feeding structure 510 may be electrically connected to the first feeding port 721 of the PCB 700. The PCB 700 may include a ground 730. For example, the ground 730 may be disposed at the second surface of the PCB 700.

Figure 13:
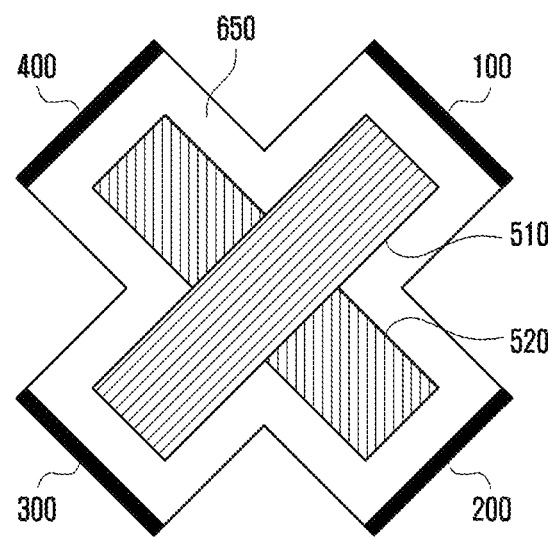
FIG. 13 is a conceptual diagram illustrating an upper surface of an antenna according to an embodiment of the disclosure.

FIG. 13 is a conceptual diagram illustrating an upper surface of an antenna according to an embodiment of the disclosure.

With reference to FIG. 13, the fifth support structure 650 may be coupled to the first feeding structure 510, the second feeding structure 520, the first dipole antenna 100, the second dipole antenna 200, the third dipole antenna 300, and the fourth dipole antenna 400.

The fifth support structure 650 may separate the first feeding structure 510, the second feeding structure 520, the first dipole antenna 100, the second dipole antenna 200, the third dipole antenna 300, and the four dipole antenna 400 by a predetermined distance.

The first feeding structure 510 may be a rectangular plate having a constant horizontal width. The second feeding structure 520 may be a rectangular plate having a constant horizontal width.

Figure 14:
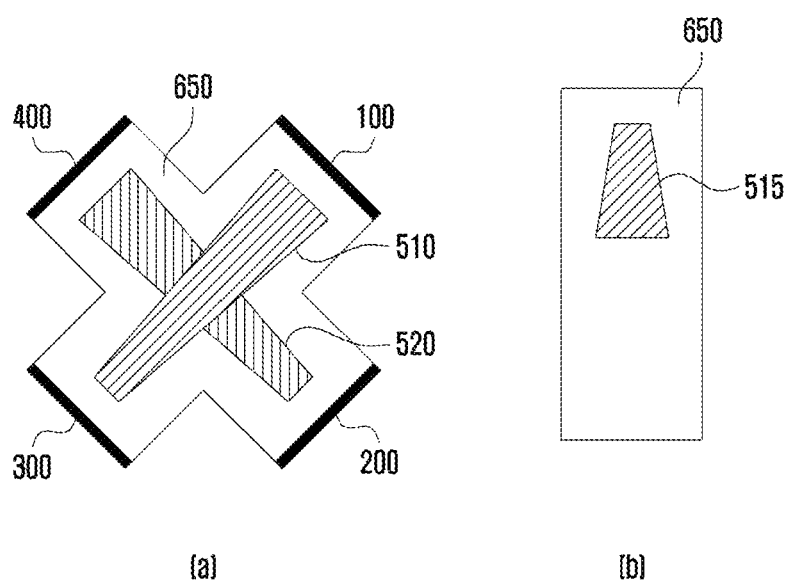
FIG. 14 is a conceptual diagram illustrating an upper surface of an antenna and one side surface of a first feeding structure according to an embodiment of the disclosure.

FIG. 14 is a conceptual diagram illustrating an upper surface of an antenna and one side surface of a first feeding structure according to an embodiment of the disclosure.

With reference to FIG. 14, the first feeding structure 510 may be a plate having a non-uniform horizontal width. For example, the first feeding structure 510 may be a trapezoidal plate in which a horizontal width of the first bending part 515 is narrower than a horizontal width of the third bending part 517.

Further, the second feeding structure 520 may be a plate having a non-uniform horizontal width. For example, the second feeding structure 520 may be a trapezoidal plate in which a horizontal width of a first bending part 525 is narrower than a horizontal width of a third bending part 527.

Figure 15:
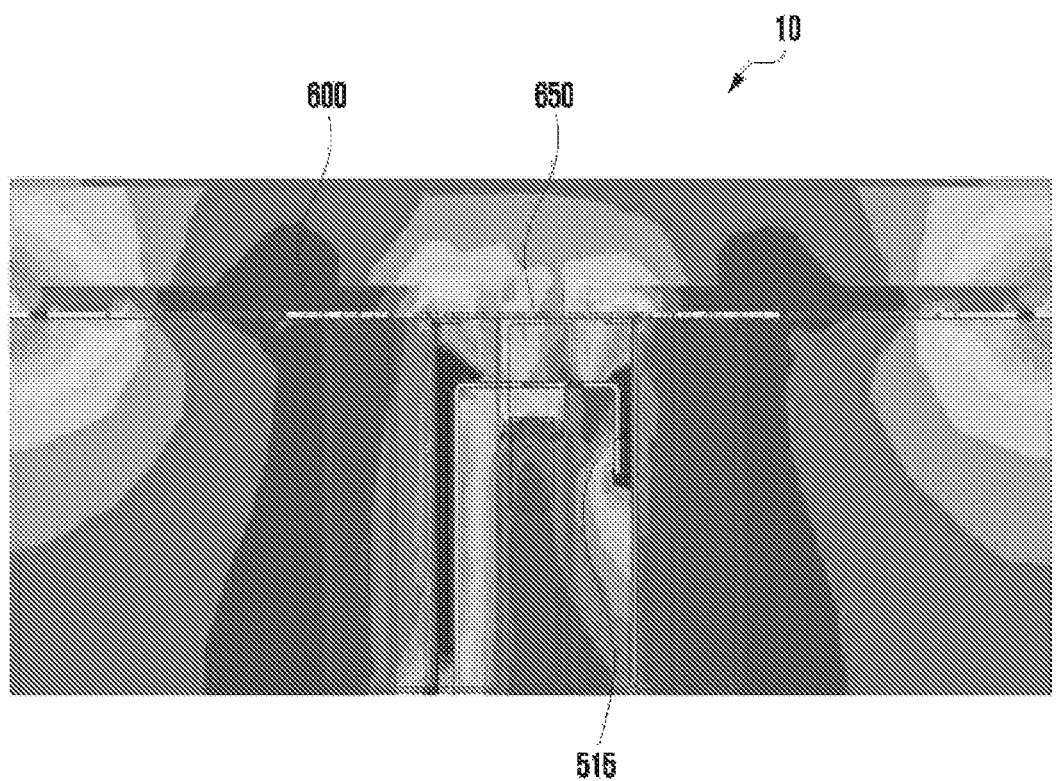
FIG. 15 is a conceptual diagram illustrating an electromagnetic field characteristic of a feeding structure according to an embodiment of the disclosure.

Electromagnetic field characteristics of the trapezoidal first feeding structure 510 and second feeding structure 520 may be the same as those of FIG. 15. The electromagnetic field characteristics of FIG. 15 may be electromagnetic field characteristics in a low band of 2.3 GHz.

Figure 16:
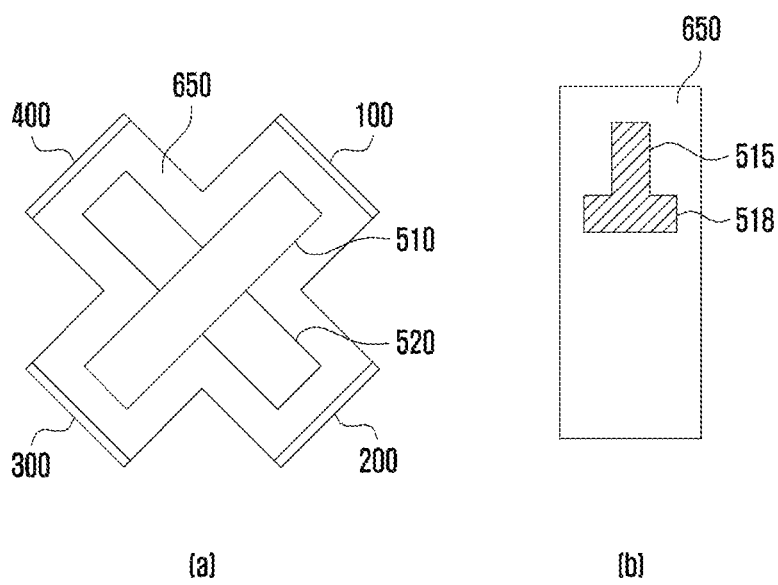
FIG. 16 is a conceptual diagram illustrating an upper surface of an antenna and one side surface of a first feeding structure according to an embodiment of the disclosure.

FIG. 16 is a conceptual diagram illustrating an upper surface of an antenna and one side surface of a first feeding structure according to an embodiment of the disclosure.

With reference to FIG. 16, the first feeding structure 510 may be a plate having a non-uniform horizontal width. For example, the first bending part 515 of the first feeding structure 510 may include an extension 518 extended to the left and right.

Further, the second feeding structure 520 may be a plate having a non-uniform horizontal width. For example, the first bending part 525 of the second feeding structure 520 may include an extension 528 extended to the left and right.

Figure 17:
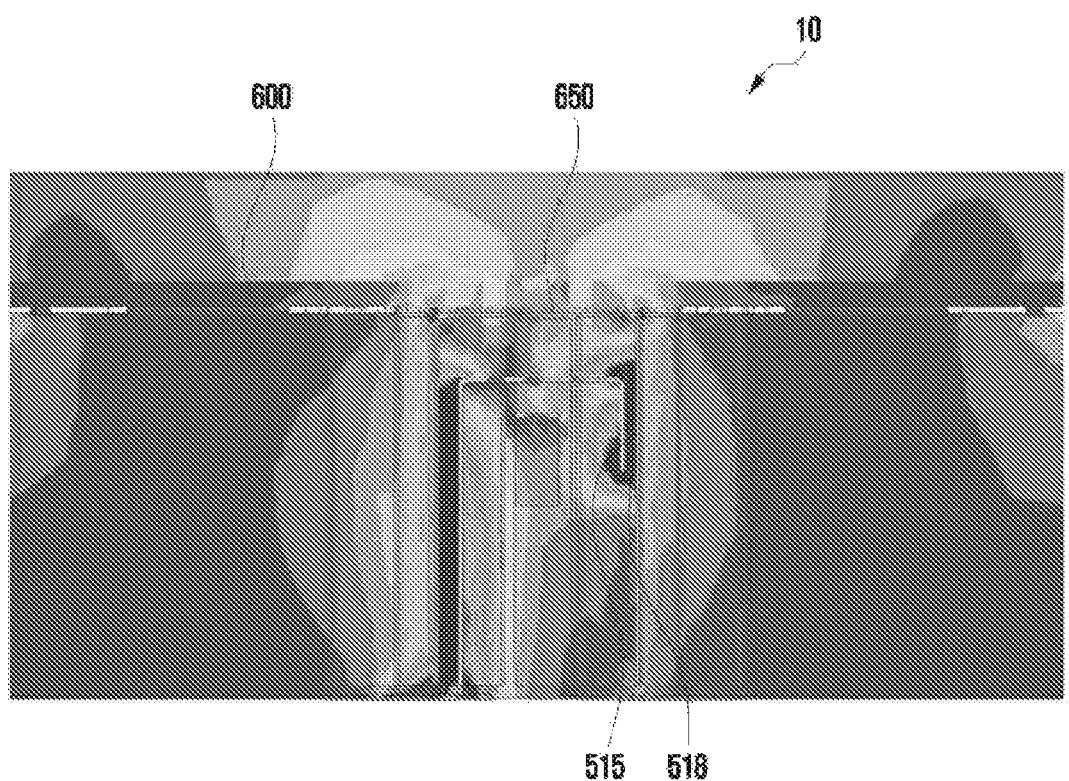
FIG. 17 is a conceptual diagram illustrating an electromagnetic field characteristic of a feeding structure according to an embodiment of the disclosure.

For example, electromagnetic field characteristics of the first feeding structure 510 including the extension 518 may be the same as those of FIG. 17. The electromagnetic field characteristics of FIG. 17 may be electromagnetic field characteristics in a high band of 3.5 GHz.

Figure 18:
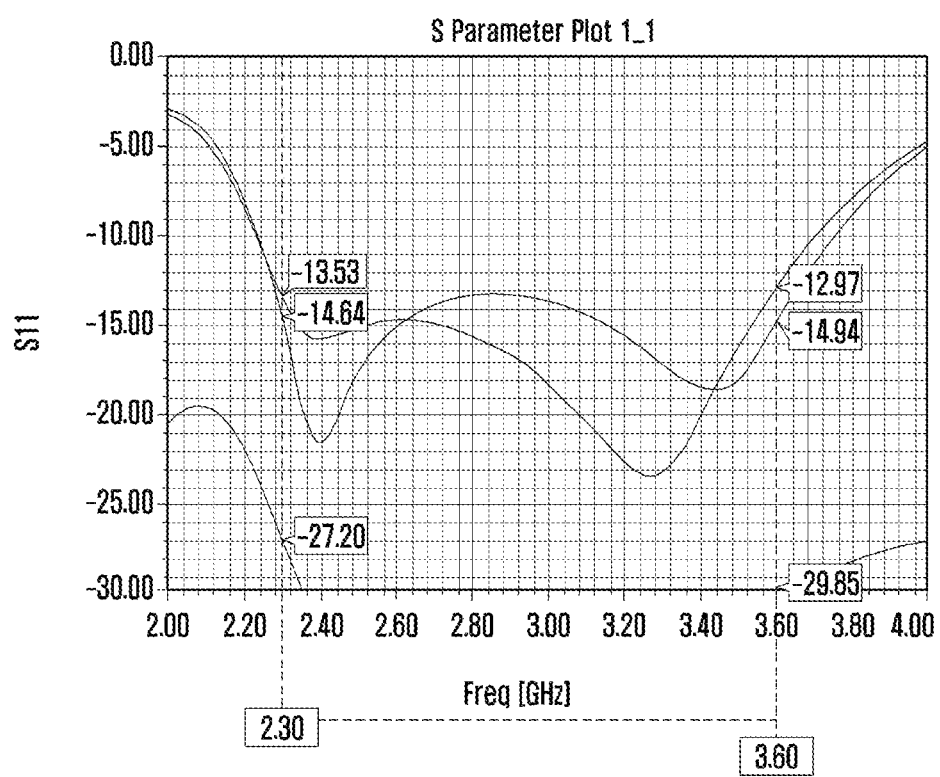
FIG. 18 is a graph illustrating an S parameter value for each frequency of an antenna according to an embodiment of the disclosure.
Figure 19:
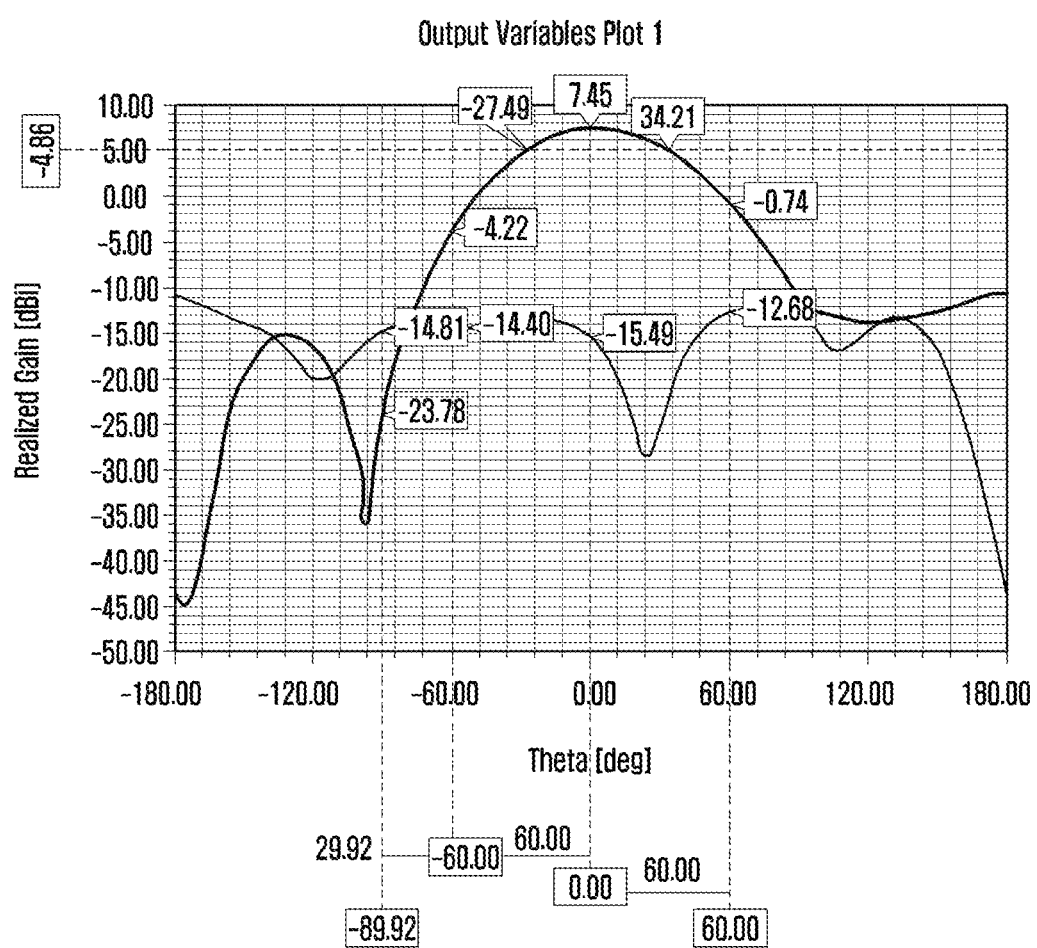
FIG. 19 is a graph illustrating a gain value for each angle of an antenna according to an embodiment of the disclosure.

A graph of an S parameter value for each frequency of the antenna 100 according to an embodiment of the disclosure may be as illustrated in FIG. 18. A graph of a gain value for each angle of the antenna 100 according to an embodiment of the disclosure may be as illustrated in FIG. 19.

Figure 20:
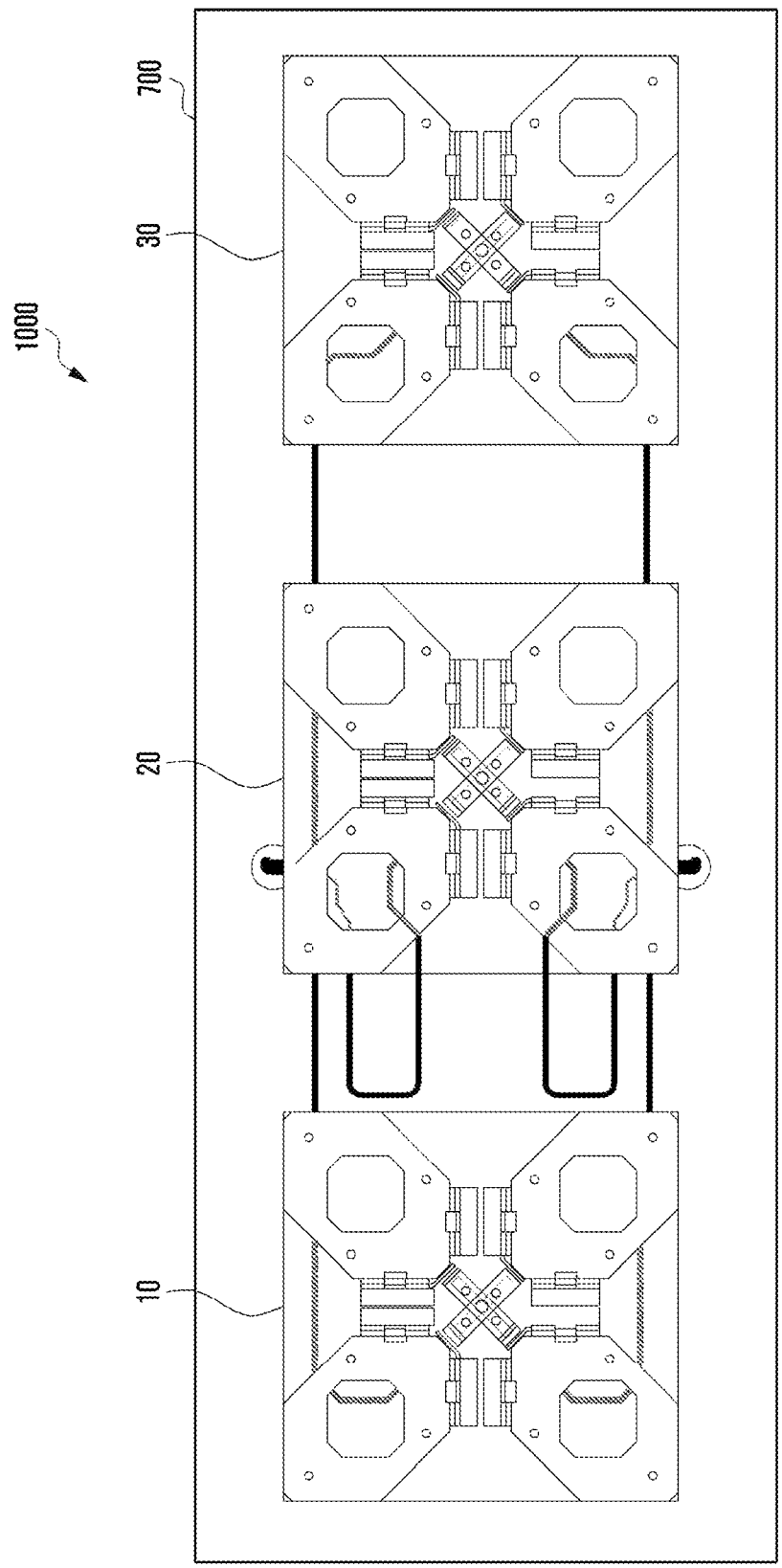
FIG. 20 is a conceptual diagram illustrating an antenna array according to an embodiment of the disclosure.

FIG. 20 is a conceptual diagram illustrating an antenna array according to an embodiment of the disclosure.

With reference to FIG. 20, an antenna array 1000 may include a first antenna 10 to a third antenna 30, and a PCB 700. The first antenna 10 to the third antenna 30 may be mounted at a first surface of the PCB 700. Each of the first antenna 10 to the third antenna 30 may have a separation distance of 71.7 mm. For example, a separation distance between the first antenna 10 and the second antenna 20 may be 71.7 mm. A separation distance between the second antenna 20 and the third antenna 30 may be 71.7 mm.

The first antenna 10 to the third antenna 30 may output a signal having a wavelength of 0.55λ in a frequency band of 2.3 GHz. The first antenna 10 to the third antenna 30 may output a signal having a wavelength of 0.84λ in a frequency band of 3.5 GHz.

Figure 21:
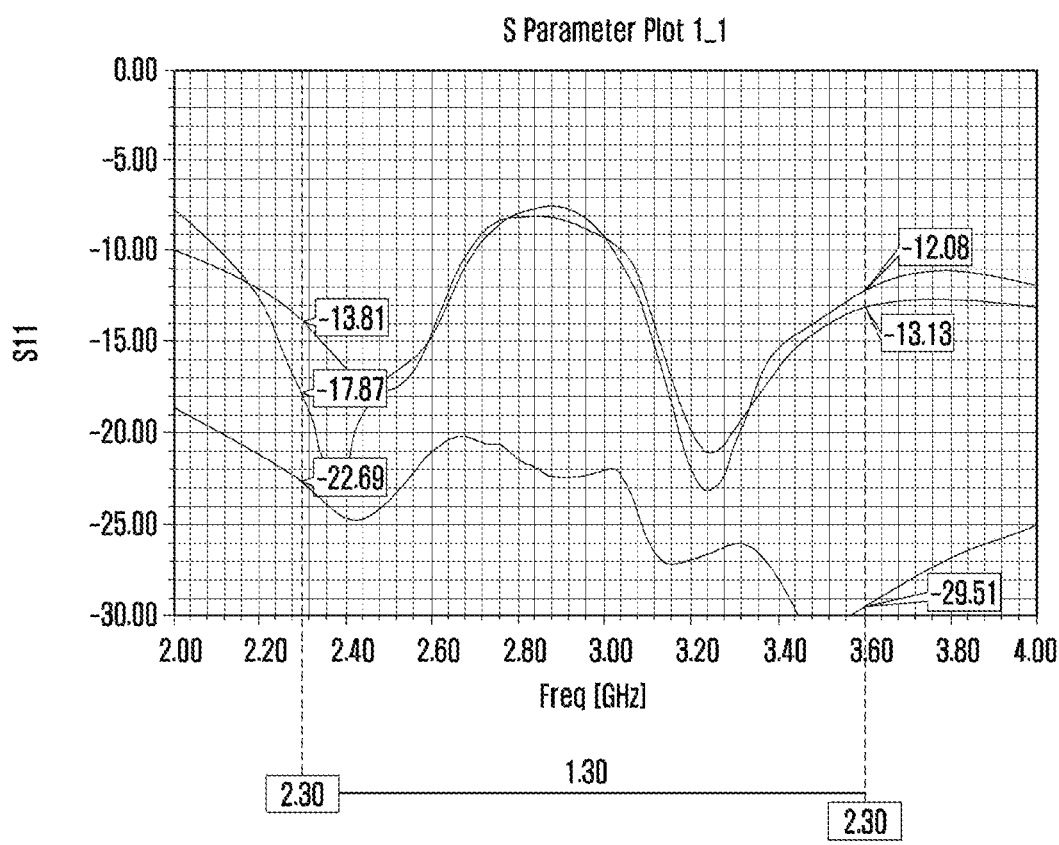
FIG. 21 is a graph illustrating an S parameter value for each frequency of an antenna array according to an embodiment of the disclosure.
Figure 22:
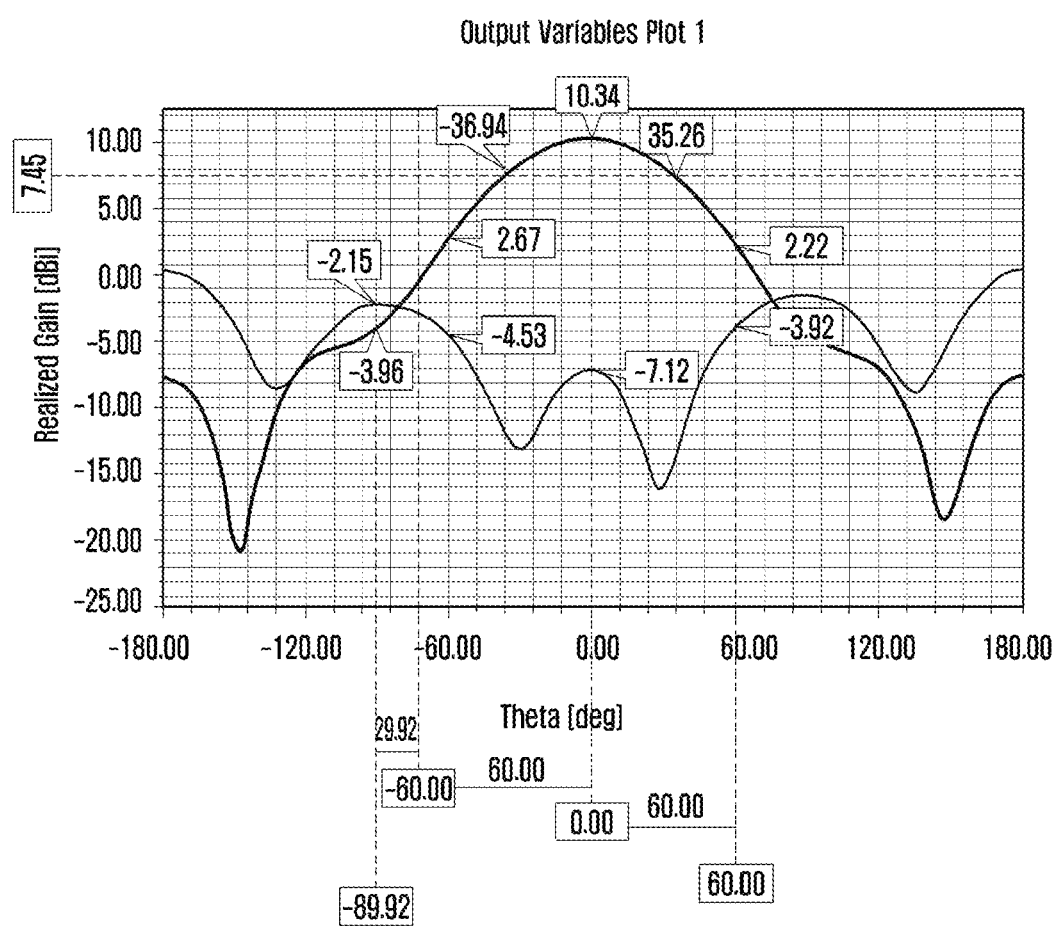
FIG. 22 is a graph illustrating gain values for each angle in a low frequency band of an antenna array according to an embodiment of the disclosure.
Figure 23:
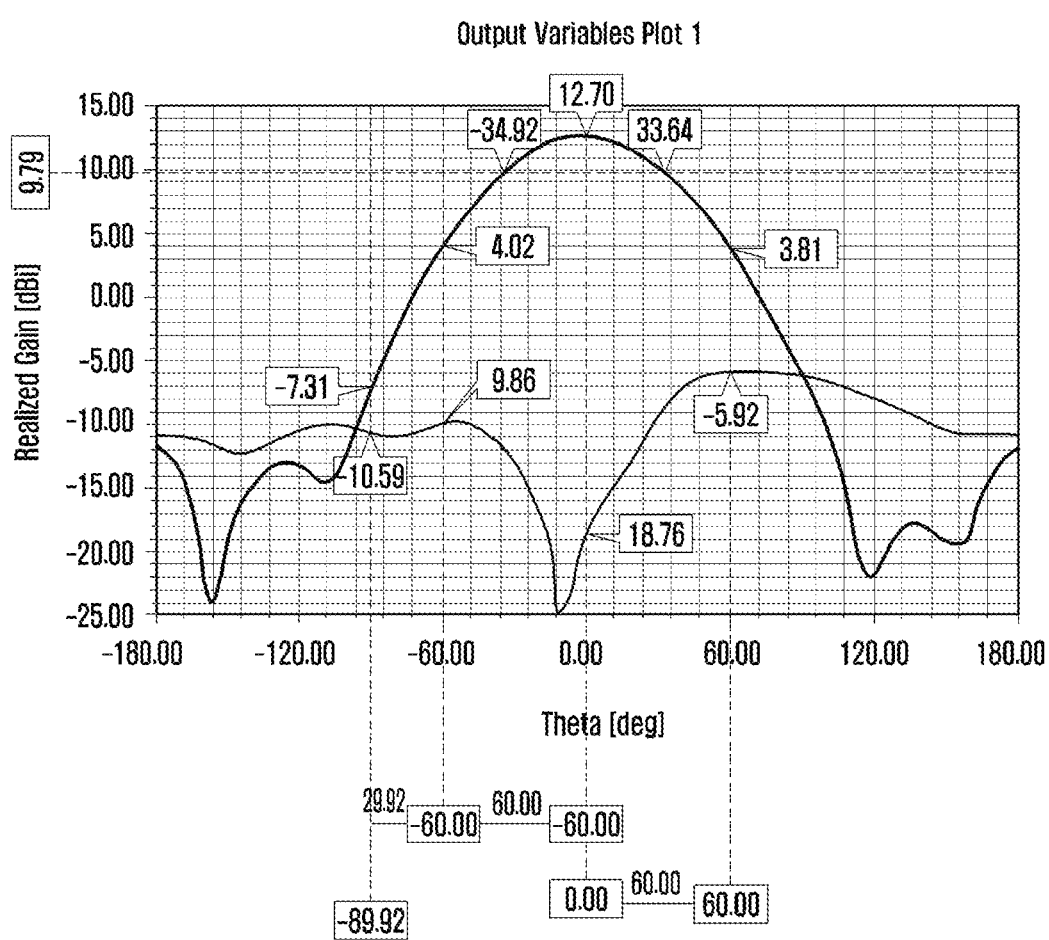
FIG. 23 is a graph illustrating gain values for each angle in a high frequency band of an antenna array according to an embodiment of the disclosure.

A graph of an S parameter value for each frequency of the antenna array 1000 according to an embodiment of the disclosure may be as illustrated in FIG. 21. A graph of a gain value for each angle in a low frequency band (2.3 GHz, gain 10.3 dBi) of the antenna array 1000 according to an embodiment of the disclosure may be as illustrated in FIG. 22. A graph of a gain value for each angle in a high frequency band (3.6 GHz, gain 12.7 dBi) of the antenna array 1000 according to an embodiment of the disclosure may be as illustrated in FIG. 23.

Figure 24:
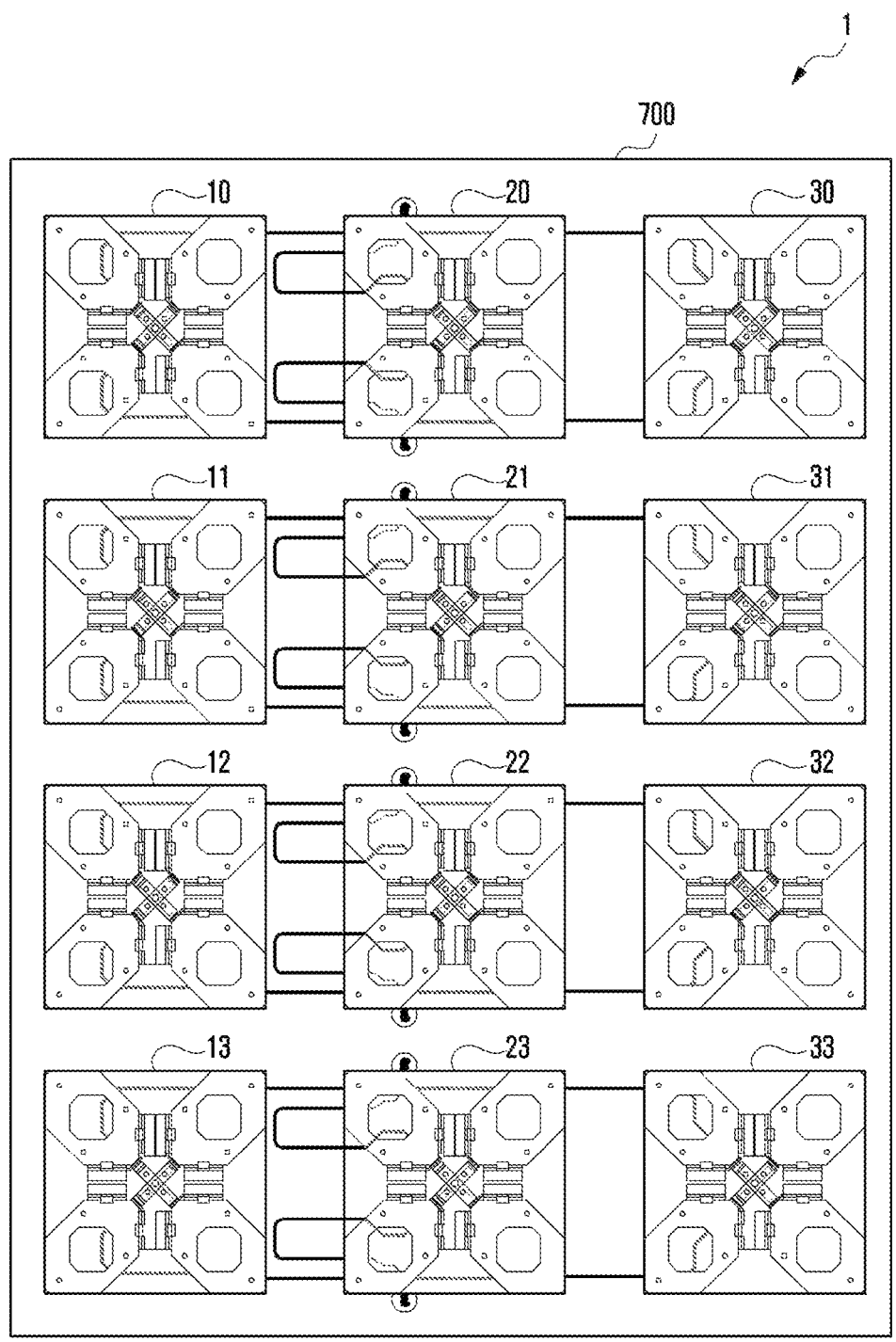
FIG. 24 is a conceptual diagram illustrating an antenna array according to an embodiment of the disclosure.

FIG. 24 is a conceptual diagram illustrating an antenna array according to an embodiment of the disclosure.

With reference to FIG. 24, the antenna array 1000 may include a first antenna 10 to a twelfth antenna 33, and a PCB 700. The first antenna 10 to the twelfth antenna 33 may be mounted at a first surface of the PCB 700.

For example, the first antenna 10, the second antenna 20, and the third antenna 30 may be disposed in a first column of a first surface of the PCB 700. A fourth antenna 11, a fifth antenna 21, and a sixth antenna 31 may be disposed in a second column of the first surface of the PCB 700. A seventh antenna 12, an eighth antenna 22, and a ninth antenna 32 may be disposed in a third column of the first surface of the PCB 700. A tenth antenna 13, an eleventh antenna 23, and a twelfth antenna 33 may be disposed in a fourth column of the first surface of the PCB 700.

Each of the first to third columns may have a separation distance of 71.7 mm. For example, a separation distance between the first antenna 10 and the fourth antenna 11 may be 71.7 mm. A separation distance between the fourth antenna 11 and the seventh antenna 12 may be 71.7 mm. A separation distance between the seventh antenna 12 and the eleventh antenna 13 may be 71.7 mm.

The antenna array 1000 may output a signal having a wavelength of 0.55λ in a frequency band of 2.3 GHz. The antenna array 1000 may output a signal having a wavelength of 0.84λ in a frequency band of 3.5 GHz.

For example, a performance of the antenna array 1000 in frequency bands of 2.3 GHz and 3.6 GHz may be illustrated in Tables 1 to 3.

TABLE 1

| UE Beam | 2.3 GHz | | 3.6 GHz | |
|---|---|---|---|---|
| | P | N | P | N |
| Gain | 16.4 | 16.4 | 19.0 | 18.9 |
| CPR @ 0 | 21.1 | 20.8 | 24.8 | 25.4 |

TABLE 2

| | | 2.3 GHz | 3.6 GHz |
|---|---|---|---|
| Isolation worst | X-pol | −20.1 | −28.4 |
| | Co-po | −18.2 | −28.2 |

TABLE 3

| | 2.3 GHz | | | | 3.6 GHz | | | |
|---|---|---|---|---|---|---|---|---|
| | V/H | | | | | | | |
| | P | | N | | P | | N | |
| | beam | | | | | | | |
| | C1 | C2 | C1 | C2 | C1 | C2 | C1 | C2 |
| Gain | 10.8 | 10.0 | 10.6 | 10.0 | 13 | 12.9 | 13 | 12.9 |
| HPBW_H | 78.0 | 84.9 | 79.6 | 86.1 | 66.6 | 67.1 | 64.4 | 66.1 |
| BW_H_10db | 128 | 135 | 129 | 133 | 112 | 111 | 112 | 109 |
| CPR @ 0 | 25.5 | 18.0 | 23.6 | 17.5 | 24.2 | 29.2 | 23.7 | 23.5 |
| CPR @ 60 | 9.66 | 10 | 8.5 | 10.7 | 13.4 | 10.8 | 11 | 10 |
| FBR | 21 | 22 | 21.5 | 20 | 28.3 | 23.1 | 24.3 | 21.9 |

Figure 25:
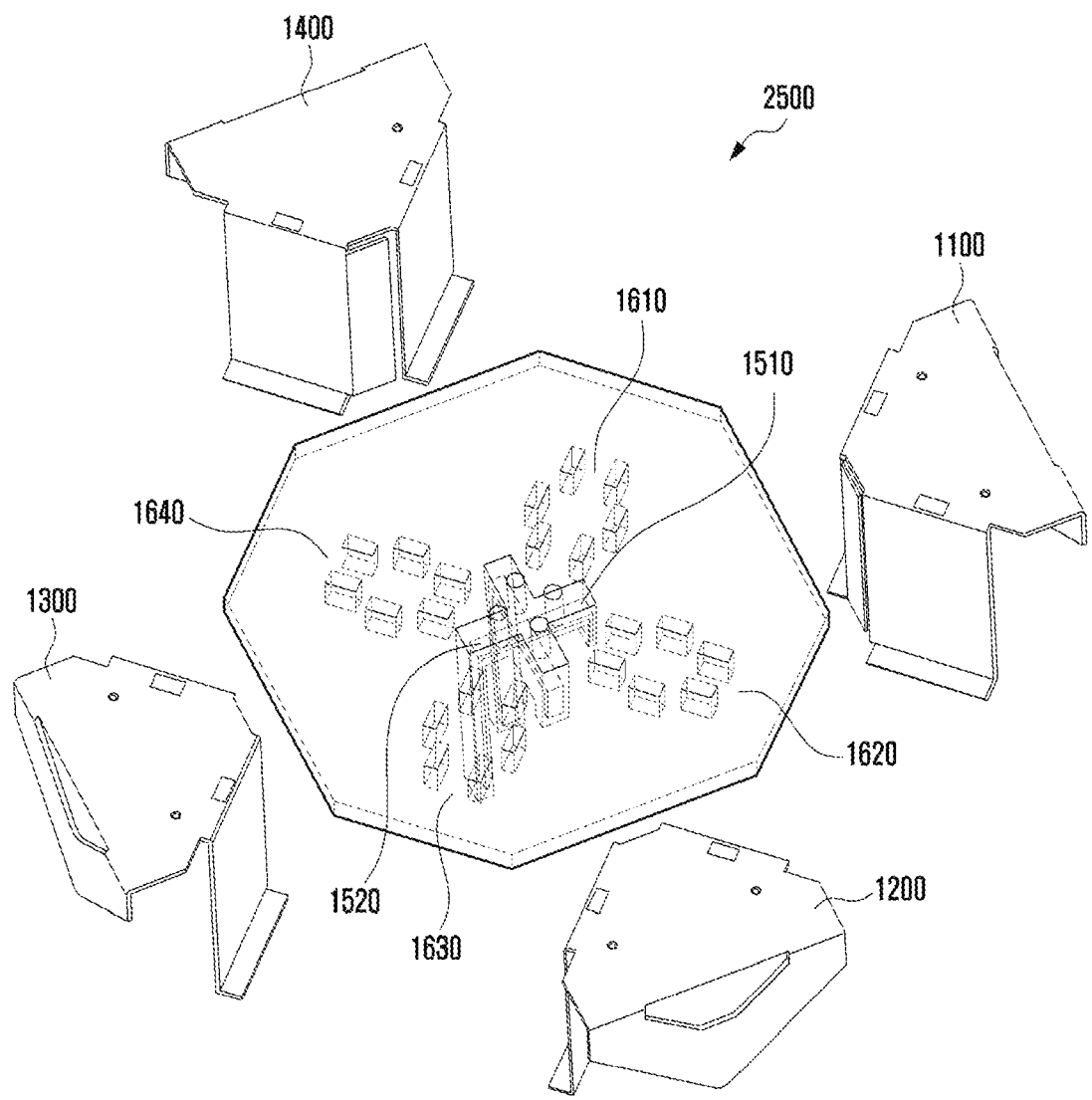
FIG. 25 is a perspective view illustrating an antenna according to an embodiment of the disclosure.

FIG. 25 is a perspective view illustrating an antenna according to an embodiment of the disclosure.

With reference to FIG. 25, an antenna 2500 may include a plurality of dipole antennas 1100 to 1400, a feeding structure 1500, and a supporting dielectric structure 1600.

Here, the antenna 2500 may be the same as or similar to the above-described antenna 10. The plurality of dipole antennas 1100 to 1400 may be the same as or similar to the above-described plurality of dipole antennas 100 to 400. However, the plurality of dipole antennas 1100 to 1400 may be folded dipole antennas. For example, a radiator 1110 of the first dipole antenna 1100 may be an octagonal conductive plate similar to the radiator 110 of the first dipole antenna 100. However, the radiator 1110 of the first dipole antenna 1100 may be bent by a predetermined angle of ½ based on the central part.

The supporting dielectric structure 1600 may be the same as or similar to the above-described supporting dielectric structure 600. However, the supporting dielectric structure 600 may have a quadrangular shape, whereas the supporting dielectric structure 1600 may have an octagonal shape. For example, the supporting dielectric structure 1600 may have an octagonal shape according to a folded shape of radiators of each of the plurality of dipole antennas 1100 to 1400.

The feeding structure 1500 may be the same as or similar to the above-described feeding structure 500.

The supporting dielectric structure 1600 may include a plurality of support structures 1610 to 1650. For example, the plurality of support structures 1610 to 1650 may be formed at a second surface of the supporting dielectric structure 1600. For example, the fifth support structure 1650 may be formed in a central portion of the second surface of the supporting dielectric structure 1600. The feeding structure 1500 may be coupled to the supporting dielectric structure 1600 through the fifth support structure 1650. For example, the feeding structure 1500 may be coupled to the fifth support structure 1650. For example, a first surface of a main body 1511 of a first feeding structure 1510 and a first surface of a main body 1521 of a second feeding structure 1520 may face the fifth support structure 1650.

The first to fourth support structures 1610 to 1640 may be formed at the second surface of the supporting dielectric structure 1600 about the fifth support structure 1650. For example, the first support structure 1610 may be formed between a first area 1611 and a fourth area 1614 of the second surface of the supporting dielectric structure 1600. The second support structure 1620 may be formed between the first area 1611 and a second area 1612 of the second surface of the supporting dielectric structure 1600. The third support structure 1630 may be formed between the second area 1612 and a third area 1613 of the second surface of the supporting dielectric structure 1600. The fourth support structure 1640 may be formed between the third area 1613 and the fourth area 1614 of the second surface of the supporting dielectric structure 1600.

Figure 26:
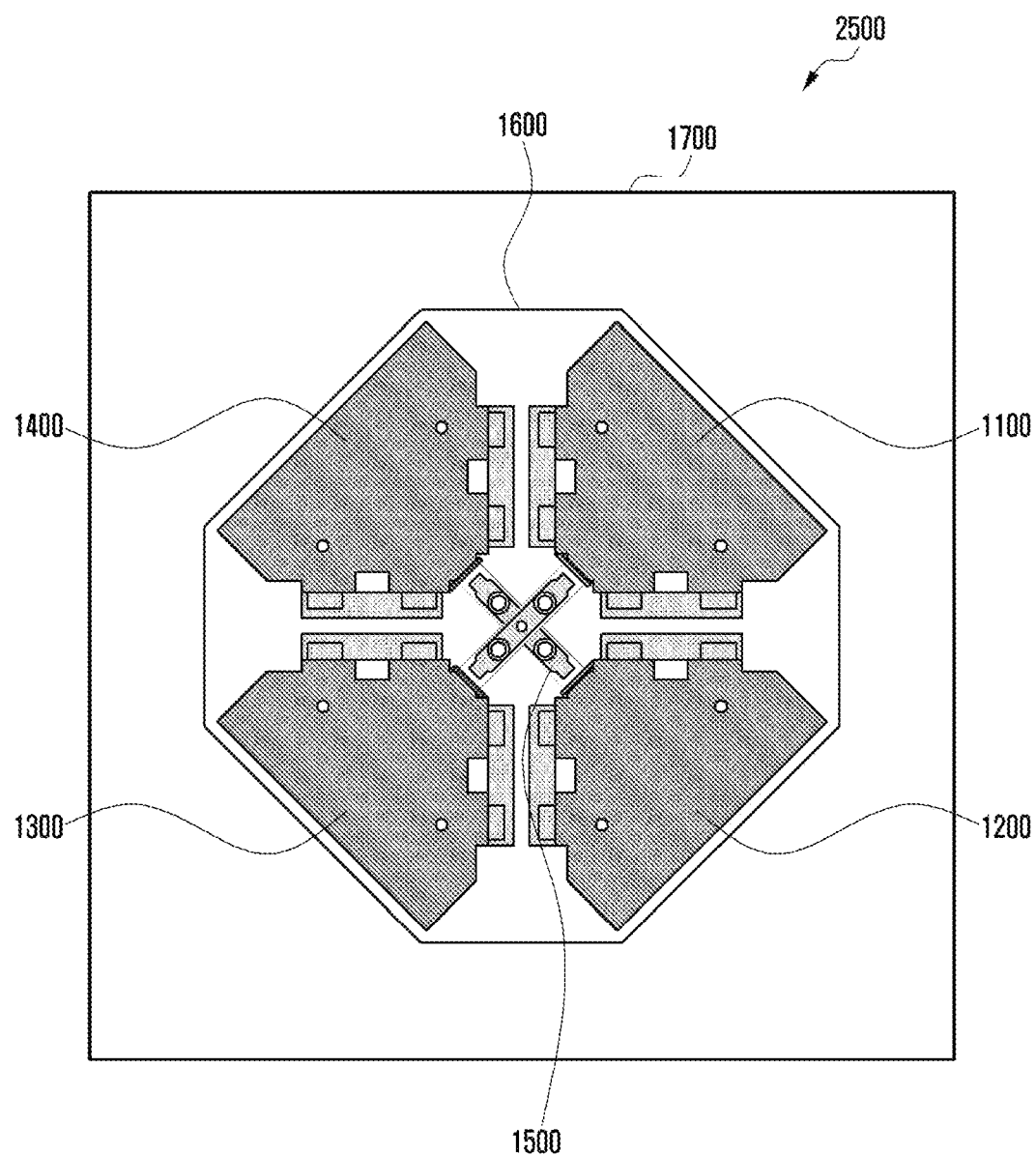
FIG. 26 is a conceptual diagram illustrating an antenna and a PCB according to an embodiment of the disclosure.

FIG. 26 is a conceptual diagram illustrating an antenna and a PCB according to an embodiment of the disclosure.

With reference to FIG. 26, the first dipole antenna 1100 may be disposed in the first area 1611 of a second surface of the supporting dielectric structure 1600. For example, a first surface of the radiator 1110 of the first dipole antenna 1100 may face the first area 1611 of the second surface of the supporting dielectric structure 1600.

The second dipole antenna 1200 may be disposed in a second area 1612 of the second surface of the supporting dielectric structure 1600. For example, a first surface of the radiator 1210 of the second dipole antenna 1200 may face the second area 1612 of the second surface of the supporting dielectric structure 1600.

The third dipole antenna 1300 may be disposed in a third area 1613 of the second surface of the supporting dielectric structure 1600. For example, a first surface of the radiator 1310 of the third dipole antenna 1300 may face the third area 1613 of the second surface of the supporting dielectric structure 1600.

The fourth dipole antenna 1400 may be disposed in a fourth area 1614 of the second surface of the supporting dielectric structure 1600. For example, a first surface of the radiator 1410 of the fourth dipole antenna 1400 may face the fourth area 1614 of the second surface of the supporting dielectric structure 1600.

The first dipole antenna 1100 may receive electricity through the first feeding structure 1510. The radiator 1110 of the first dipole antenna 1100 may output a wireless signal to the outside based on an electrical signal supplied from the first feeding structure 1510. For example, the radiator 1110 may form an electromagnetic field in a direction of an arrow according to an electrical signal supplied from the first feeding structure 1510.

The third dipole antenna 1300 may receive electricity through the first feeding structure 1510. The radiator 1310 of the third dipole antenna 1300 may output a wireless signal to the outside based on an electrical signal supplied from the first feeding structure 1510. For example, the radiator 1310 may form an electromagnetic field in a direction of an arrow according to an electrical signal supplied from the first feeding structure 1510.

For example, an electric field E and a magnetic field H formed by the radiator 1110 of the first dipole antenna 1100 or the radiator 1310 of the third dipole antenna 1300 may be defined as in Equation 1 or 2. Further, the electric field E and the magnetic field H may be defined as in Equation 3.

Figure 27:
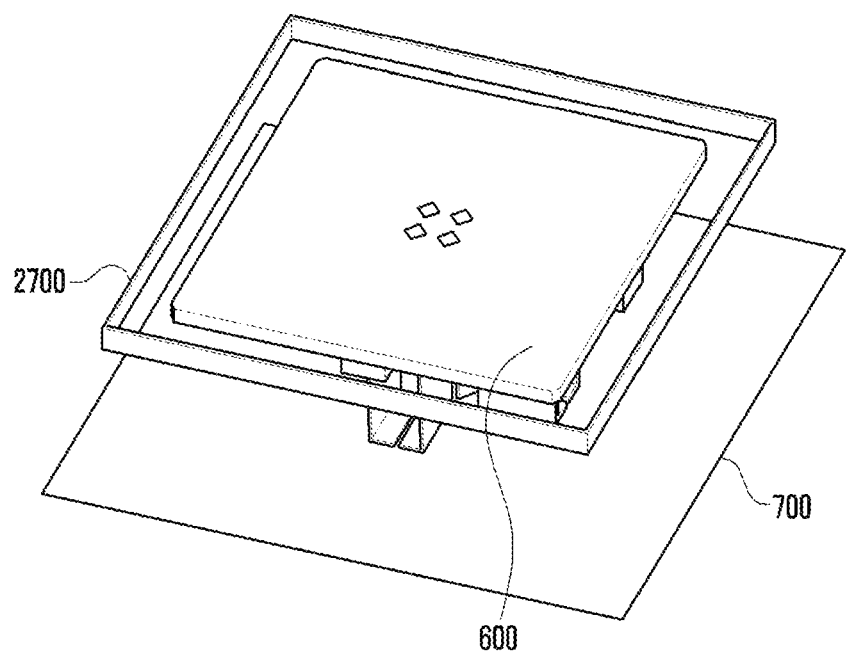
FIG. 27 is a conceptual diagram illustrating a supporting dielectric structure including a parasitic element according to an embodiment of the disclosure.

FIG. 27 is a conceptual diagram illustrating a supporting dielectric structure including a parasitic element according to an embodiment of the disclosure.

With reference to FIG. 27, the supporting dielectric structure 600 may further include a parasitic element 2700. For example, the parasitic element 2700 may be disposed to enclose side surfaces of the supporting dielectric structure 600.

Figure 28:
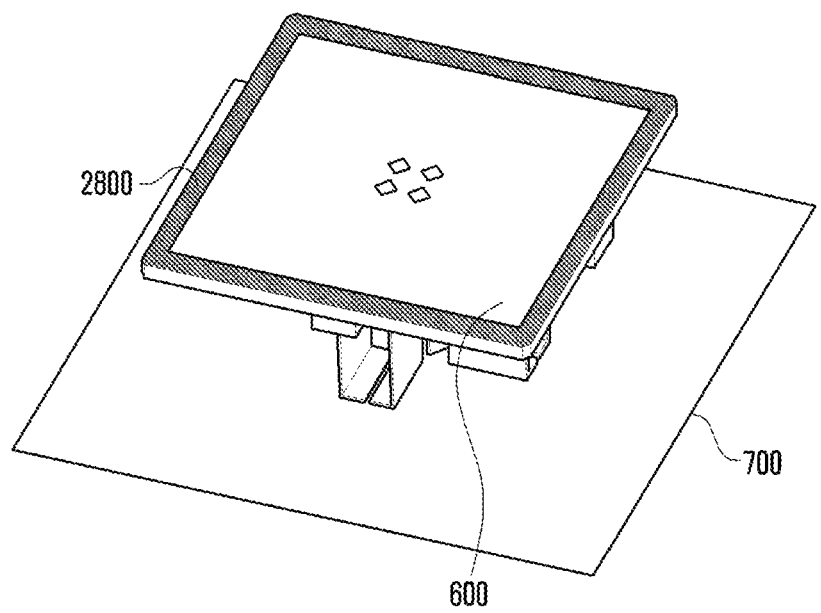
FIG. 28 is a conceptual diagram illustrating a supporting dielectric structure including a parasitic element according to an embodiment of the disclosure.

FIG. 28 is a conceptual diagram illustrating a supporting dielectric structure including a parasitic element according to an embodiment of the disclosure.

With reference to FIG. 28, the supporting dielectric structure 600 may further include a parasitic element 2800. For example, the parasitic element 2800 may be disposed to enclose an edge of the supporting dielectric structure 600.

Embodiments of the disclosure disclosed in this specification and drawings present specific examples to easily describe the technical contents of the disclosure and to help the understanding of the disclosure, and are not intended to limit the scope of the disclosure. That is, it is apparent to those of ordinary skill in the art to which other modifications based on the technical spirit of the disclosure may be implemented. Further, each of the above embodiments may be operated in combination with each other, as needed.

INDUSTRIAL APPLICABILITY

The disclosure can be used in the electronics industry and information and communications industry.

The invention claimed is:
1. An antenna structure, comprising:
a printed circuit board comprising a first ground port, a second ground port, and a first feeding port;
a first antenna electrically connected to the first ground port;
a second antenna electrically connected to the second ground port; and
a first feeding plate comprising:
a first bending part electromagnetically coupled to the first antenna,
a second bending part electromagnetically coupled to the second antenna, and a third bending part electrically connected to the first feeding port, wherein the first antenna comprises:
a radiator,
a first ground plate connected to a first side surface of the radiator,
a first ground part connected to a second side surface of the first ground plate,
a second ground plate connected to a second side surface of the radiator,
a second ground part connected to a second side surface of the second ground plate, and
a third ground plate connected to a third side surface of the second ground plate.

2. The antenna structure of claim 1, wherein the first feeding plate further comprises a first body connected to the first bending part and the second bending part.

3. The antenna structure of claim 2, wherein the first bending part is bent by 90 degrees in a direction of a lower surface of the first body.

4. The antenna structure of claim 2, wherein the second bending part is bent by a predetermined angle in a direction of a lower surface of the first body.

5. The antenna structure of claim 3,
wherein the third bending part is connected to the second bending part, and
wherein the third bending part is bent by a predetermined angle in a direction of an upper surface of the second bending part.

6. The antenna structure of claim 1, wherein a length of the first bending part is shorter than that of the second bending part.

7. The antenna structure of claim 1, wherein the first ground plate is bent by a predetermined angle in a direction of the second side surface of the radiator.

8. The antenna structure of claim 7,
wherein the first ground part is bent by a predetermined angle in a direction of a first surface of the first ground plate, and
wherein the first ground part is electrically connected to the first ground port.

9. The antenna structure of claim 1, wherein the second ground plate is bent by a predetermined angle in a direction of the second side surface of the radiator.

10. The antenna structure of claim 9,
wherein the second ground part is bent by a predetermined angle in a direction of a first surface of the second ground plate, and
wherein the second ground part is electrically connected to the first ground port.

11. The antenna structure of claim 10, wherein the third ground plate is bent by a predetermined angle in a direction of a second surface of the first ground plate.

12. The antenna structure of claim 1, wherein the printed circuit board further comprises a third ground port, a fourth ground port, and a second feeding port.

13. The antenna structure of claim 12, further comprising:
a third antenna electrically connected to the third ground port;
a fourth antenna electrically connected to the fourth ground port; and
a second feeding plate comprising:
a first bending part electromagnetically coupled to the third antenna,
a second bending part electromagnetically coupled to the second antenna, and
a third bending part electrically connected to the first feeding port.

14. The antenna structure of claim 13,
wherein the second feeding plate is disposed at a lower end of the first feeding plate, and
wherein the second feeding plate is disposed to cross the first feeding plate in a cross shape.

15. The antenna structure of claim 1, further comprising:
wherein a first ground plate is connected to a first side surface of the radiator, the first ground plate having a central groove at one end.

16. The antenna structure of claim 15, further comprising:
a first ground part connected to a second side surface of the first ground plate, the first ground part having two grooves at one end.

* * * * *